(12) United States Patent
Latzina et al.

(10) Patent No.: US 7,870,499 B2
(45) Date of Patent: Jan. 11, 2011

(54) SYSTEM FOR COMPOSING SOFTWARE APPLIANCES USING USER TASK MODELS

(75) Inventors: Markus Latzina, Wiesenbach (DE); Katharina Goering, Karlsruhe (DE)

(73) Assignee: SAP AG, Walldorf (DE)

(*) Notice: Subject to any disclaimer, the term of this patent is extended or adjusted under 35 U.S.C. 154(b) by 818 days.

(21) Appl. No.: 11/825,445

(22) Filed: Jul. 6, 2007

(65) Prior Publication Data

US 2008/0288877 A1 Nov. 20, 2008

Related U.S. Application Data

(60) Provisional application No. 60/918,399, filed on Mar. 16, 2007.

(51) Int. Cl.
*G06F 15/00* (2006.01)
*G06F 13/00* (2006.01)

(52) U.S. Cl. .................................. 715/763; 715/765

(58) Field of Classification Search ......... 715/762–765, 715/853–855, 728–742, 737
See application file for complete search history.

(56) References Cited

U.S. PATENT DOCUMENTS

| | | | |
|---|---|---|---|
| 6,118,939 A | 9/2000 | Nack et al. | |
| 6,275,225 B1 | 8/2001 | Rangarajan et al. | |
| 6,778,971 B1 | 8/2004 | Altschuler | |
| 6,941,519 B1 | 9/2005 | Jerome et al. | |
| 6,996,798 B2 | 2/2006 | Ali et al. | |
| 7,047,498 B2 | 5/2006 | Lui et al. | |
| 7,072,810 B2 | 7/2006 | Ramanathan et al. | |
| 7,100,147 B2 | 8/2006 | Miller | |
| 2001/0044738 A1 | 11/2001 | Elkin et al. | |
| 2003/0200531 A1 | 10/2003 | Fairweather | |
| 2006/0136922 A1* | 6/2006 | Zimberg et al. | 718/100 |
| 2007/0245300 A1* | 10/2007 | Chan et al. | 717/105 |

OTHER PUBLICATIONS

Baron, Mickael, et al., "SUIDT: A task model based GUI builder", *Proceedings of the First International Workshop on Task Models and Diagrams for User Interface Design*, (2002),64-71.

Clerckx, Tim, et al., "Integrating Task Models in Automatic User Interface Generation", *Technical Report TR-LUC-EDM-0302*, EDM/LUC Diepenbeek, Belgium,(Jun. 2, 2003),1-87.

Girard, Patrick, et al., "Integrating formal apporaches in Human-Computer Interaction. methods and tools: an experience", *Proceedings of INTERACT 2003—Bringing the Bits together—Ninth IFIPTC13 International Conference on Human-Computer Interaction—Workshop—Closing the Gaps: Software Engineering and Human-Computer Interaction*, (2003),55-62.

(Continued)

*Primary Examiner*—Cao Kevin Nguyen
(74) *Attorney, Agent, or Firm*—Schwegman, Lundberg & Woessner, P.A.

(57) ABSTRACT

A method, of composing a software application having a user interface, includes receiving input relating to a plurality of tasks and defining a task model of a process, the plurality of tasks including at least one user task to be performed by a user of the application; automatically identifying a plurality of user interface templates by identifying at least one user interface template associated with at least a subset of the plurality of tasks; and creating a user interface model for an application using the plurality of user interface templates.

27 Claims, 22 Drawing Sheets

OTHER PUBLICATIONS

Figure 1:
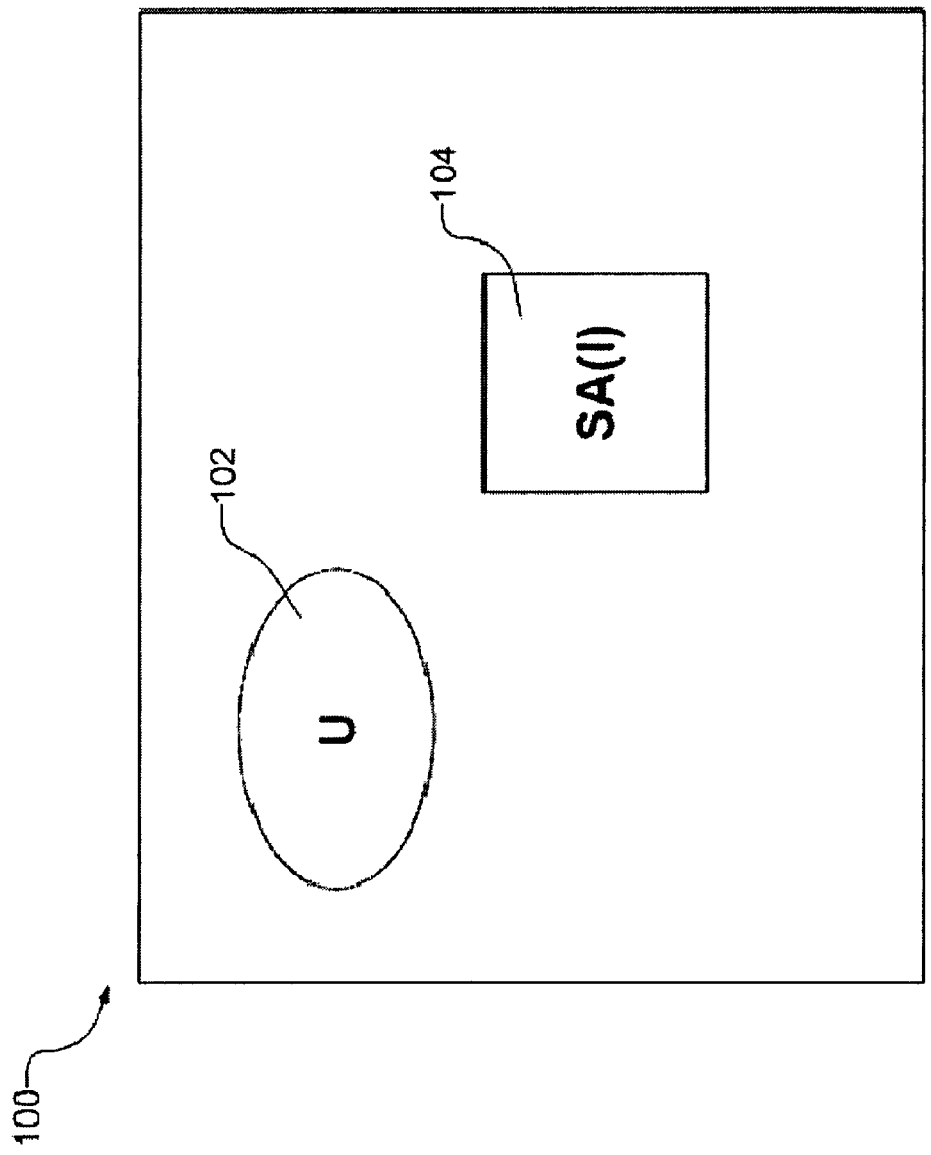

Kenn, H., et al., "Concurrent Task Trees, Chapter 1", *Wearable Computing—Vorlesung im Wintersemester*, Technologie-Zentrum Informatik (TZI) der Universität Bremen,(2005),1-8.

Paquette, David, et al., "Interaction Templates for Constructing User Interfaces from Task Models", *Interaction Templates for Constructing User Intefaces from Task Models in Computer Aided Design of User Intefaces IV*, Edited by Robert J. K. Jacob, Quentin Limbourg, Jean Vanderdonckt. Kluwer Academic Publishers, Dordrecht,(2005),1-13.

Paquette, D., "Simulating Task Models Using Concrete User Interface Components", *Department of Computer Science. University of Saskatchewan*, (2004),1-12.

Pribeanu, Costin, "An Approach to Task Modeling for User Interface Design", *Enformatika, Transactions on Engineering, Computing and Technology*, 5 (Apr. 2005),5-8.

Wolff, Andreas, et al., "Linking GUI Elements to Tasks—Supporting an Evolutionary Design Process", *Proceedings of the 4th International Workshop on Task Models and Diagrams*, Session: Derivation of UI from task: systematic processes, methods, and tools,(2005),27-34.

* cited by examiner

Legend
Task Concept
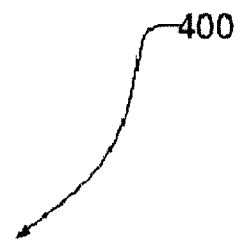
400
Task Not Assigned
Task Assigned
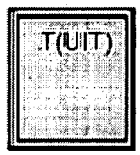
Task Concept
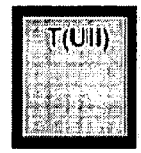
Task Concept
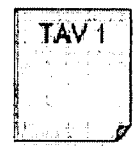
Varient of Task Concept
User Interface Template
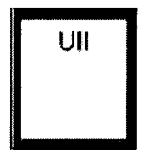
User Interface Instance
*FIG. 4*

**Lookup Object > Receive Information > Edit Object
> Create Object**

Lookup Object > Receive Information > Edit Object
> Create Object
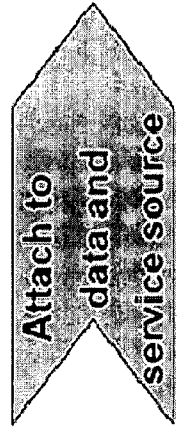
Attach to data and service source
Lookup Equipment > Receive Information about single Equipment > Edit Equipment
> Create new Equipment
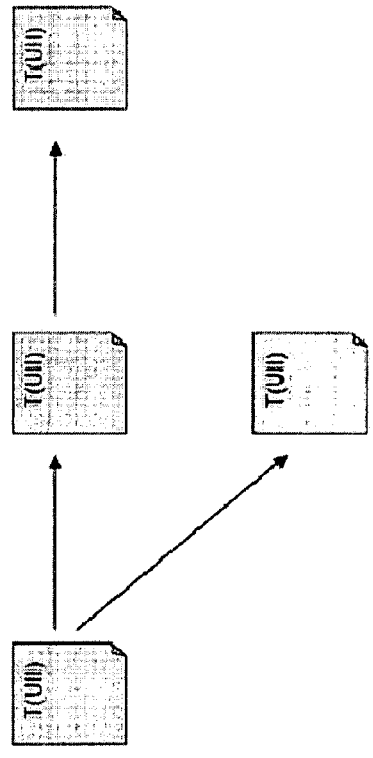
FIG. 9

SYSTEM FOR COMPOSING SOFTWARE APPLIANCES USING USER TASK MODELS

RELATED APPLICATION

The present patent application claims the priority benefit of the filing date of U.S. Provisional Application Ser. No. 60/918,399 filed Mar. 16, 2007, and entitled "SYSTEM FOR DEVELOPING SOFTWARE APPLIANCES USING USER TASK MODELS", the entire content of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007, SAP AG, All Rights Reserved.

FIELD

This application relates to methods and systems for composing software appliances (e.g., applications).

BACKGROUND

The creation of user interfaces (UIs) is an important part of any design and creation of a software appliance. Software appliances may be of numerous types, ranging from transaction-oriented applications to information-oriented websites or pages, or any combinations of these examples poles. Currently, the creation of UIs, with the help of development environments or tools, requires the skills of software programmers who are specialists in preparing the appropriate software code and/or UI designers who are skilled in preparing the user interface and ensuring standard usability criteria. Further, current systems (e.g., development environments) for designing and creating software appliances are too complicated and require software coding knowledge and experience to be useful to a particular domain expert who may not have the software coding and/or UI designing knowledge or experience.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Below are described example systems and methods for creating software and that supports the preparation of software applications that have UIs which are based on, but not confounded with, task models (e.g., user task models). Further, the example systems may allow the derivation of UI models which differ from user task models, such as for example business processes or business scenario models. Further, the example systems may allow for the derivation of UI models which are different from task models (e.g., user task models), and which use user task models as an intermediary or bridging layer.

Example embodiments of composing a software application having a UI are described herein. Example embodiments include receiving input that defines a task model of a process. In example embodiments, the task model includes more than one task. At least one of the tasks may be performed by a user of the software application. In example embodiments, the task model may model the process independent of UI features and independent of components of the software application. In example embodiments, UI templates are automatically identified that are associated with some or all of the tasks. Example embodiments include using the identified UI templates to create a UI model for the software application.

The example systems for composing software appliances may be used by non-programmers and/or non-designers, (e.g., business process experts, such as solution analysts or product managers) to create software appliances with UIs, on the basis of task models (e.g., user task models) and predefined UI templates.

The example systems may facilitate the model-based creation of software appliances in which modelers are not required to have programming or coding skills, and do not need to engage in programming or coding in order to create software appliances that meet defined software quality standards and/or criteria (e.g., software usability standards defined by the International Organization for Standardization (ISO)). Further, the example systems may be deployed to enable modelers having no or limited UI designing skills to create software appliance UIs which comply, for example, with software standards and/or criteria (e.g., software usability standards defined by the ISO). In other words, the example systems and methods may be used to enable the creation of UIs for a software appliance in a manner that does not impede users as a result of a lack of knowledge or skills in either programming or in UI designs.

Further, example methods and systems may enable modelers to model a user experience in terms of tasks (e.g., user tasks) without the need to specify UI features, which may be required by end users in order to perform tasks using the software appliance's UI. In an example embodiment, modelers may be enabled to compose a task model in a manner that is not biased by the modeler's anticipation of how the UI might or should look. In a further example, modelers may divide their work into various roles, for example, with one modeler preparing a task model (e.g., a modeler role), and another modeler configuring details of a UI template.

FIG. 1 is a block diagram illustrating a deployed software appliance environment 100, in which an end user 102 of the software appliance has access to a software appliance instance 104. In an example embodiment, the software appliance instance 104 supports certain user tasks (but not necessarily all) to be performed by the end user 102 in compliance with a user task model. Throughout the embodiments described herein, the term "user" may have more than one meaning. In an example embodiment, an "end user" (e.g., "appliance user") refers to a user for whom a software appliances is created (e.g., created using the example embodiments described herein); on the other hand, a "system user" (e.g., "modeler") refers to users of example embodiments of the methods and systems disclosed herein.

In an example embodiment, "appliance users" adopt the role of "system users" when the software appliance is configured to accomplish tasks that are typical of "system users" (e.g., task modelling, or other task to be performed by modelers). In example embodiments, "system users" may also adopt roles in addition to those that were initially allocated (e.g., roles created concurrent with added functionality to a software appliance).

Figure 2:
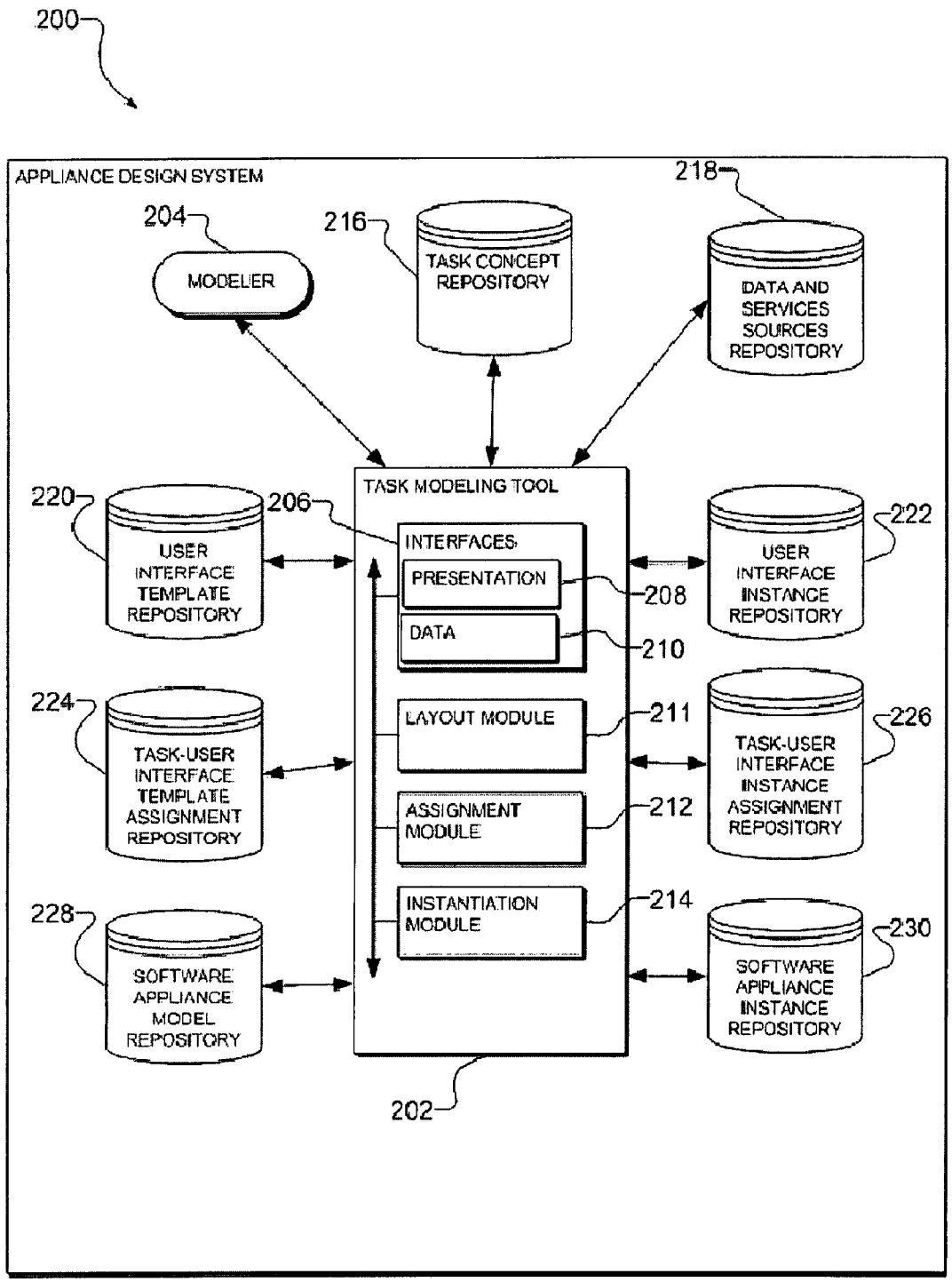

FIG. 2 is a block diagram illustrating an appliance design system 200, according to an example embodiment. The appliance design system 200 includes a number of components, including a task modeling tool 202 that is used by a modeler 204 to create a task model (e.g., a user task model). A UI model for a software appliance may be derived from such a task model. In an example embodiment, the modeler 204 may be a user of the application design system 200 who has limited or no programming or UI design skills, respectively. The task modeling tool 202 includes a number of components including a set of interfaces 206, via which the task modeling tool 202 interacts with various components, and service and data resources. The interfaces 206 may include a presentation interface 208 that is responsible for the generation and layout of UIs, examples of which are described below with reference to subsequent figures. The interfaces 206 also include a data interface 210 that allows the task modeling tool 202 to interface with various repositories, such as those illustrated in FIG. 2.

The task modeling tool 202 also includes a layout module 211, which a modeler 204 may use to define a flow of tasks (e.g., user tasks), and an assignment module 212, which is responsible for automatically identifying one or more UI templates (or UI instances) that are associated with a particular task (again, as will be described in further detail below). An instantiation module 214 is responsible for the creation of a UI model for a software appliance based on UI template or instance assignments identified by the assignment module 212.

The various components of the task modeling tool 202 are communicatively coupled. This communicative coupling enables the various modules to pass data and signals to each other. While the communicative coupling is shown in FIG. 2 by a representative bus, it will be appreciated that the communicative coupling between these modules may be achieved through various data structures or other well-known means.

The application design system 200 also includes a number of repositories storing data, objects or structures used by the task modeling tool 202. A task concept repository 216 stores multiple task concepts that may be predefined or created by the modeler 204 and that may be used to design a task flow (e.g., a sequence of tasks) to be performed by an eventual end user of the software appliance. Numerous examples of task concepts are discussed below. The task concepts may include multiple dimensions, which may, in an example, be realized through tagging task concepts.

Example tags may include a semantic tag, which supports modelers in modeling semantic relationships between task concepts. For example, a tag can indicate whether a task concept can serve as the starting points in a sequence of modeled task concepts, or whether a particular task concept should serve as a successor for a task concept that is in focus.

In various examples, semantic tags may also be deployed to describe concepts for any one of a number of usage purposes. Some examples of semantic tags include tags that indicate an activity in which the relevant task concept occurs, a context (e.g., a psycho-physical setting, culture, society or group) in which the task concept may be deployed or a skill set that encompasses a mastery of the relevant task (e.g., a semantic tag, tagging a task concept may indicate the skill set required of a system user (e.g., a modeler)). In an example embodiment, semantic tags may indicate system users' roles (e.g., different modelers' roles) so that multiple system users (e.g., modelers) are distinguished, enabling the system users to separately contribute to and/or participate in a set of tasks that benefit from a coordinative effort. In example embodiments, semantic tags may describe an industry in which the task occurs, results that flow from accomplishing the task, preconditions for executing the task, or duration for completing the task, etc. Semantic tags may contain, in the various examples, information about the relationship of a particular task to any of the above listed factors. For example, the occurrence of a particular task within a particular context may be critical, recommended, beneficial, or detrimental to the relevant context. Accordingly, semantic tags may be used, for example, to exclude a specific task from being used in a model where the performance of the task is suspected to have a negative impact.

An assignment tag may be used by a modeler to indicate whether a particular task concept has been associated with (e.g., by way of assignment) with a UI template (or a structure of UI templates).

While the task concept repository 216 may store a collection of predefined task concepts, the task modeling tool 202 may enable a modeler 204 to create a new task concept, for example by duplicating existing task concepts and changing their names. Having created a new task concept, a modeler 204 may save the task concept to the task concept repository 216 for reuse.

A data and services sources repository 218 embodies software logic and data objects that are exposed to software logic of a software appliance that is being designed.

A UI template repository 220 stores a collection of UI templates (e.g., predefined UIs that have not been linked to respective data and services sources), while a UI instance repository 222 stores UI instances (e.g., UI templates that have been linked to appropriate data and services sources).

A task-UI template assignment repository 224 stores assignments between task concepts (as stored within the task concept repository 216), and UI templates or UI template structures. Similarly, a task-UI instance assignment repository 226 stores assignments between task concepts and UI instances, or UI instance structures.

A software appliance model repository 228 stores un-instantiated software appliance models, while a software appliance instance repository 230 stores instantiated software appliance models (e.g., appliance models to which data and services sources have been linked, allocated or assigned).

Figure 3:
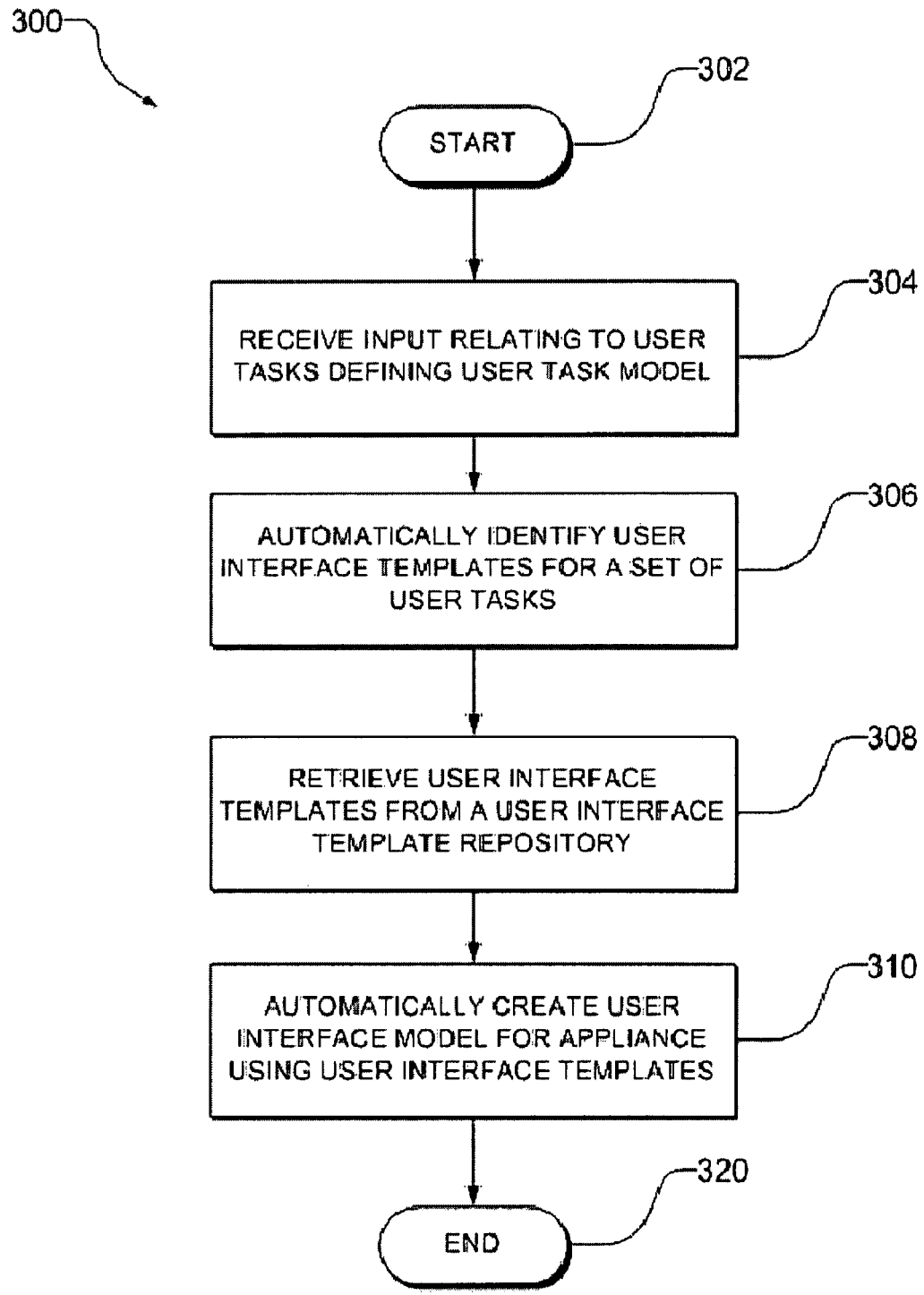

FIG. 3 is a flowchart illustrating a method 300, according to an example embodiment, of composing a software appliance that has a user interface. More detailed example usage scenarios are discussed below, and the description accompanying FIG. 3 provides a high level overview of an example methodology.

The method 300 may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above. It will be noted, that, in an example embodiment, the processing logic may reside in any of the modules described herein.

The method 300 commences at operation 302, and progresses to operation 304, where input is received by the task modeling tool 202 from a modeler that defines a task model of a process, in the example form of user tasks that define the task model. The input relating to the user tasks may comprise identification of user tasks from a palette of predefined task concepts, and also a specification of a task flow related to performance of the user tasks. The task flow defines a sequence in which the user tasks are to be performed by an eventual end user of the software appliance. In addition, the task model may model the process independent of a feature of the user interface and independent of a component of the software appliance. The input received at operation 304 may be received via the presentation interface 208 of the task modeling tool 202.

In one embodiment, the receiving of the input relating to the tasks may include detecting, using the presentation interface 208, a connecting operation (e.g., in the form of a drag and drop operation) with respect to a task identifier displayed within a task list display area of a design UI. The connecting operation may be to relocate the task identifier to a task flow display area within the design UI, e.g. by means of a drag and drop operation.

At operation 306, the task modeling tool 202, and specifically the assignment module 212, automatically identifies UI templates for a set of the user tasks, for which input was received at operation 304. Specifically, the assignment module 212 of the task modeling tool 202 may access one of the task-UI template assignment repository 224 or the task-UI instance assignment repository 226 in order to identify UI templates that have been assigned to one or more of the user tasks.

A task-UI template assignment, or a task-UI instance assignment, (as stored within the respective repositories 224 or 226) may be manually specified by a system designer, and recorded as an indexed relationship between a particular task and a UI template or a UI instance within a respective repository. In an alternative embodiment, these assignments may be fully or partially automated based on business intelligence logic that identifies a correlation or a relationship between one or more tasks and one or more UI templates (or UI instances). For example, metadata (e.g., semantic or otherwise) may be associated with tasks and with UI templates and instances. This metadata may be utilized to automatically detect correlations or relationships. A task may for example be associated with metadata identifying at least one of an activity within which the task occurs, a sequence of tasks within the activity, a context within which the task occurs, a skill set to complete the task, an industry in which the task occurs, results from accomplishing the task, conditions for executing the task or a duration for completing the task.

It should be noted that certain of the user tasks included within a user task model may not have UI templates associated therewith. Accordingly, the automatic identification that is performed at operation 306 may include identifying those user tasks which have no UI templates associated therewith.

At operation 308, the task modeling tool 202, and specifically the data interface 210, may retrieve the appropriate UI templates, for example, from the UI template repository 220 or from the UI instance repository 222. Each of the retrieved UI templates may include a number of UI elements. In example embodiments, a UI element includes text input elements, multiple selection elements and/or single selection elements (e.g., input fields, descriptive text, checkboxes, radio buttons and other mode specific controls, etc.). Each of the retrieved UI templates may also include interaction logic that specifies interactions between the various UI elements. For example, the interaction logic may specify display relationships between the UI elements, according to which these UI elements are to be displayed within a UI derived from the relevant UI template. The interaction logic may also specify interaction relationships between the UI elements. For example, an action performed by a user with respect to one particular UI element may result in specific effect with respect to another UI element. This effect may be defined in terms of the interaction logic.

At operation 310, the task modeling tool 202 may automatically create a UI model for a software appliance, using the UI templates identified and retrieved at operations 306 and 308. In one embodiment, where data and resources are not pre-associated with a particular UI template (e.g., the UI template has not been converted into a UI instance), this creation of the UI model may include instantiating retrieved UI templates with data sources identified within the data and services sources repository 218. Similarly, instantiating the UIs may include coupling services, again identified in the data and services sources repository 218, to one or more of the UI templates.

The creation of the UI model may also include defining a flow for multiple instantiated UIs, based on the received input (e.g., a flow sequence) received with respect to the user tasks. For example, the flow sequence of the user tasks may be used to derive a flow for the generated UI model.

In an example embodiment, the task modeling tool 202 may support two roles at design time, namely that of a modeler 204 and that of a service establisher (not shown). The modeler 204, in this example, may model the application based on tasks and UIs, but may not be responsible for configuring data or services. The second role, that of a service establisher or backend specialist, may be allocated to a user who is familiar with back-end systems, and actively attaches appropriate data sources and services to the UI model created by the modeler 204. Accordingly, in this example, operations performed at 304-306 may be performed by the modeler, whereas the creation of the software appliance instance (e.g., by attaching data sources and services to a software appliance model) may be performed by the service establisher.

In various examples, software appliance instances may be created in either direction, with the modeler 204 first creating the model, and the service establisher then attaching the services, or by the service establisher first creating configured model fragments, that can then be reused by a modeler 204.

Below are described a number of example usage scenarios, which use example embodiments of the above described system and method. In a first usage scenario, a modeler 204 may use input material concerning prospective user tasks to create a task model, based on task concepts included in the task concept repository 216. The task model may be created using the task modeling tool 202 within the application design system 200.

Based on the created task model, the system 200 may propose UI templates. For example, each proposed UI template (or structure of UI templates) may be proposed on the basis of a task concept, retrieved from the task concept repository 216, which is tagged as a task concept to which UI templates are assigned. Again, such assignments may be recorded in the task-UI template assignment repository 224. Task concepts which do not have a UI tagged allow a modeler 204 to include tasks within the task model that do not need interaction with an end user of an instantiated software appliance (e.g., as stored within the software appliance instance repository 230).

For a given task concept, a modeler 204 may, in one embodiment, choose among subordinate task concept variants (e.g., subtask concepts) that have UI templates or UI instances assigned to them (e.g., see FIGS. 10-11 discussed below). For example, if a task concept is LOOKUP, examples of subordinate task concept variants may be SEARCH, BROWSE and DRILL-DOWN, with each of these task concept variants having specific UI templates or UI instances assigned to them. Accordingly, each of these task concept variants may potentially have different sequences of UI screens associated therewith (e.g., SEARCH may have a text input element (e.g., search input field), activation element (e.g., search button), an area for display of results, BROWSE may have a hierarchy or structure of nodes and subnodes for exploration, and DRILL-DOWN may have navigational structure associated therewith for navigating along hierarchically structured categories).

At the next operation, in the first example usage scenario, the modeler 204 may review the UI templates proposed by the system 200 and, by assigning data and services (identified in the data and services sources repository 218), creates a UI instance for each of the proposed UI templates. This results in the specification of a software appliance instance, with concrete UIs.

The assignment of the data and services may also be performed by a user other than the modeler 204. In one example, the assignment of the data and services may be performed by a services establisher or service programmer, as we describe in further detail below.

Turning now to a second usage scenario, the modeler 204 may use input material concerning user tasks, which are to be enabled by a specific software appliance, and use the task modeling tool 202 to create a task model on the basis of task concepts identified in the task concept repository 216. Based on the created task model, the application design system 200 may then propose a number of UI instances (as opposed to the UI templates proposed in the above described first usage scenario). Each proposed UI instance (or structure of UI instances) is proposed on the basis of a task concept that is tagged as a task concept to which UI instances are assigned (e.g., such assignments being indicated in the task-UI instance assignment repository 226). At a next operation, the modeler 204 may review the proposed UI instances, and finalize the creation of the relevant software appliance instance.

Moving on to a third example usage scenario, a modeler 204 may create a new task concept, optionally reusing existing task concepts from within the task concept repository 216. This may be performed, for example, by the modeler 204 taking an existing task concept, duplicating it and renaming the duplicated task concept. Alternatively, a new task concept may be created from scratch and given an appropriate name. In an example embodiment, a semantic tag associated with a task concept is editable (e.g., modified, deleted, added, and/or other editing actions, etc.).

At a next operation, the modeler 204 may review existing UI templates or UI instances. The modeler 204 may then assign one or more UI templates and/or UI instances to any specific task concept. A modeler 204 may also determine whether or not a task concept should be assigned to a UI template or a UI instance, respectively. In this case, a task model may include user tasks that are not supported by the "under modeling" software appliance, for reasons that are inherent to the nature of the task (e.g., fixing a broken engine part) or given a maturity of the technology (e.g., at some future date, the relevant user task may be supported by the software appliance, but at the current time is performed outside the context of the "under modeling" software appliance). The third example usage scenario then may continue with either the first or second usage scenario as discussed above.

In a fourth example usage scenario, the modeler 204 may work merely as a selector of pre-defined software appliance instances as reflected in the software appliance instance repository 230. Accordingly, a modeler 204 may choose whether a particular software appliance instance is well suited for a particular task model for the actual user tasks that require support.

It will be appreciated that the example methods and systems are usable by non-programmer users (e.g., business process experts) to define a software application instance. Further, the example methods and systems enable the modeling of user tasks, irrespective of UIs, by decoupling tasks and UI layers respectively. For example, a modeler 204 may specify a task to be included within a task model, regardless of whether or not the eventual software application instance is able to support that task and/or whether a UI is required within the context of the software appliance instance to support the relevant task.

Further, the example methods and systems may assist in compliance with software standards and/or criteria (e.g., common usability standards) by using predefined UI templates, which may have been designed by UI design experts.

FIG. 4 is a legend diagram 400 illustrating a number of symbols, and accompanying legends that are used in subsequent FIGS. 5-18.

Figure 5:
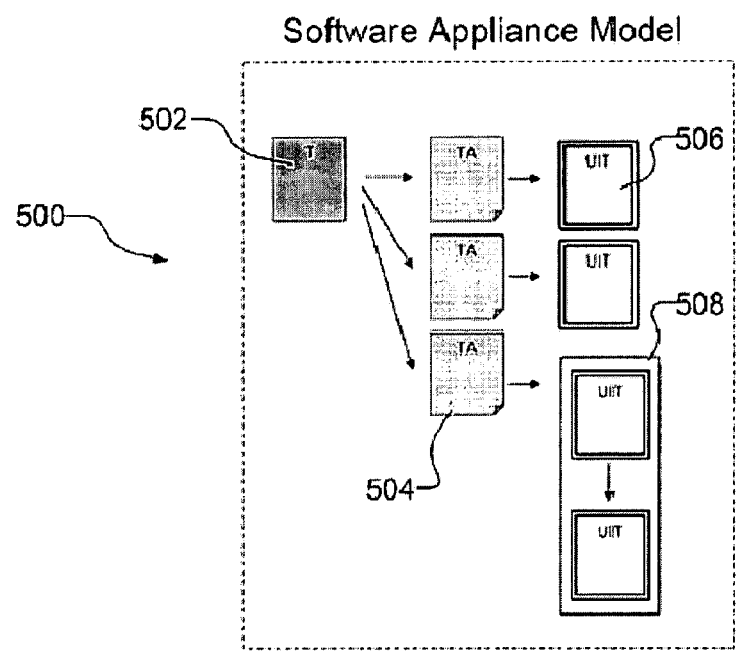

FIG. 5 is a block diagram illustrating an example software appliance model 500 in which a task concept 502 is associated, by way of task assignments 504, with two UI templates 506, as well as a collection 508 of UI templates. As noted, in an example embodiment, these assignments may be implemented using tagging. Specifically, semantic tagging may be utilized to state and define the associations between the task concept 502, the UI templates 506, and the collection 508 of UI templates.

Figure 6:
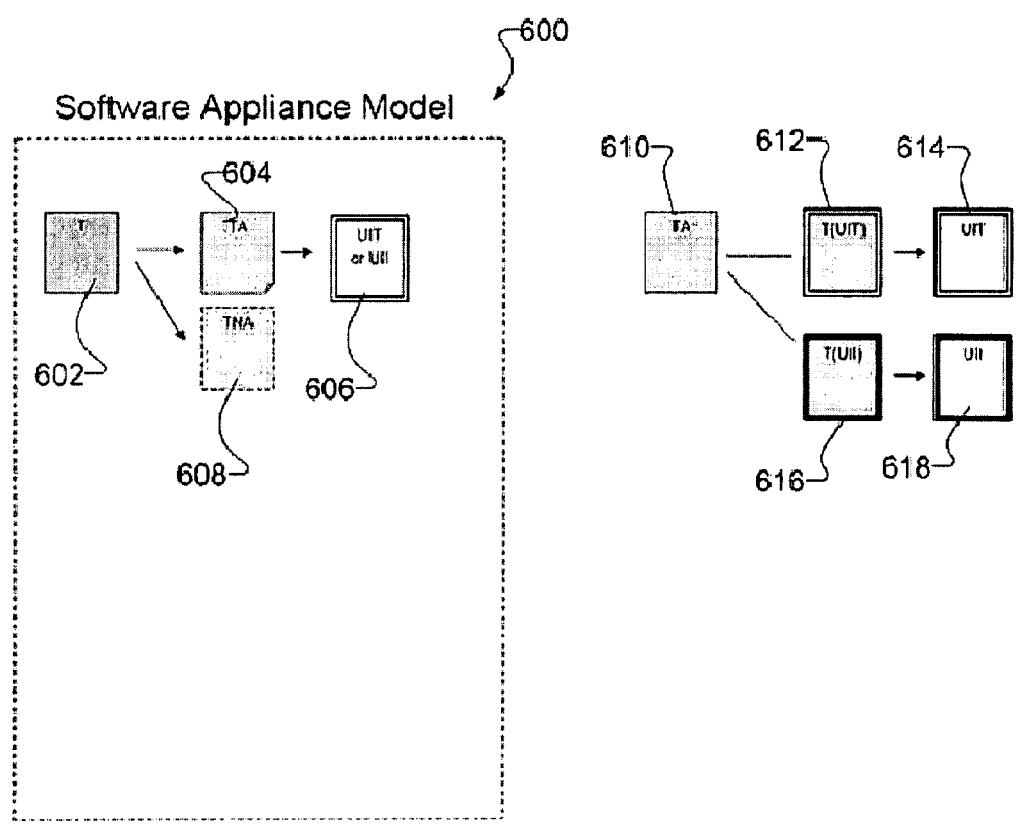

Similarly, FIG. 6 is a block diagram illustrating a software appliance model 600 in which a task concept 602 is associated, via an appropriate task assignment 604, with either a UI template or a UI instance 606. Additionally, FIG. 6 illustrates that the task may also exist in a "task not assigned" state 608, in which case no UI template or UI instance is associated with the relevant task concepts 602. FIG. 6 also illustrates that a task assignment 610 may be achieved through a task-UI template assignment 612 to a UI template 614, and/or via a task-UI instance assignment 616 to a UI instance 618.

Figure 7:
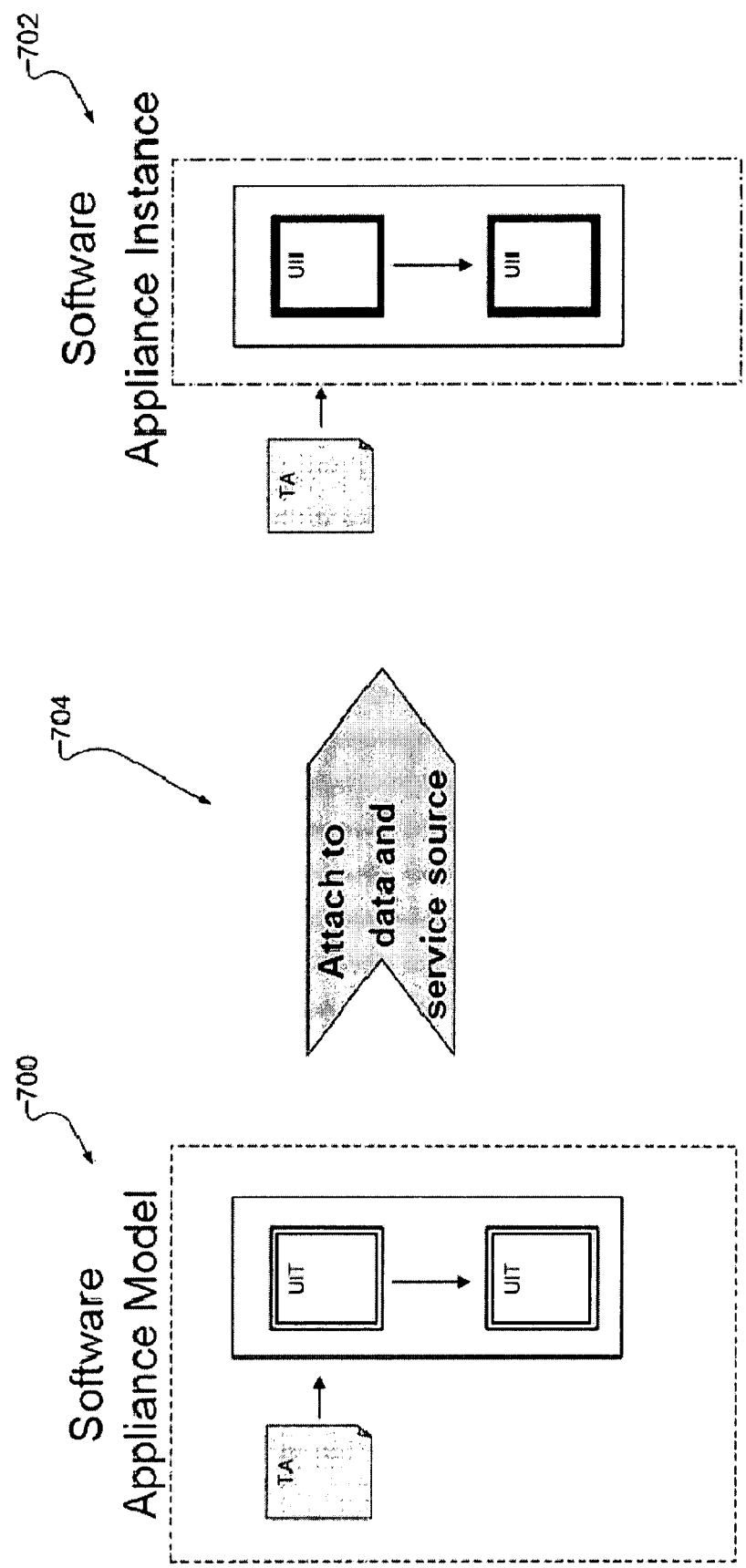

FIG. 7 is a block diagram illustrating the instantiation of a software appliance model 700 as a software appliance instance 702 by the attaching of data and service sources 704 to the software appliance model 700, in the manner described above. The instantiation of the software appliance model 700 into the instance 702 involves conversion of the respective UI templates into UI instances.

Figure 8:
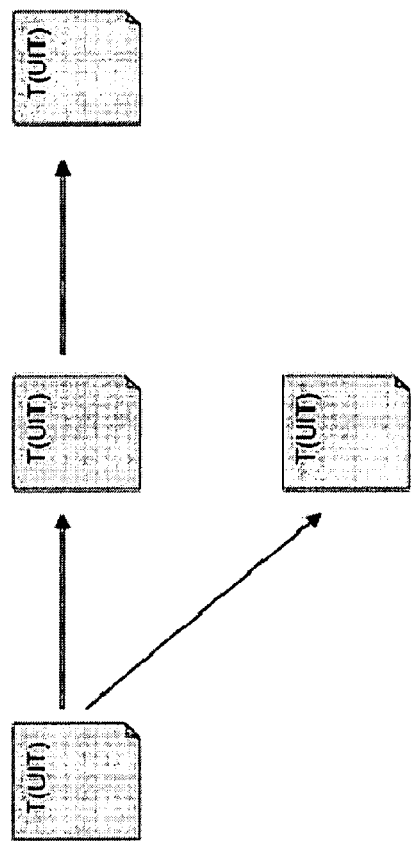

FIG. 8 is block diagrams illustrating example embodiments of task concepts assigned to UI templates and representing a task model (e.g., for looking up an object, receiving information, editing the object and creating an object). FIG. 9 illustrates task concepts assigned to UI instances when data and/or a service sources are attached. (e.g., lookup equipment, receive information about single equipment, edit equipment and create new equipment).

Figure 10:
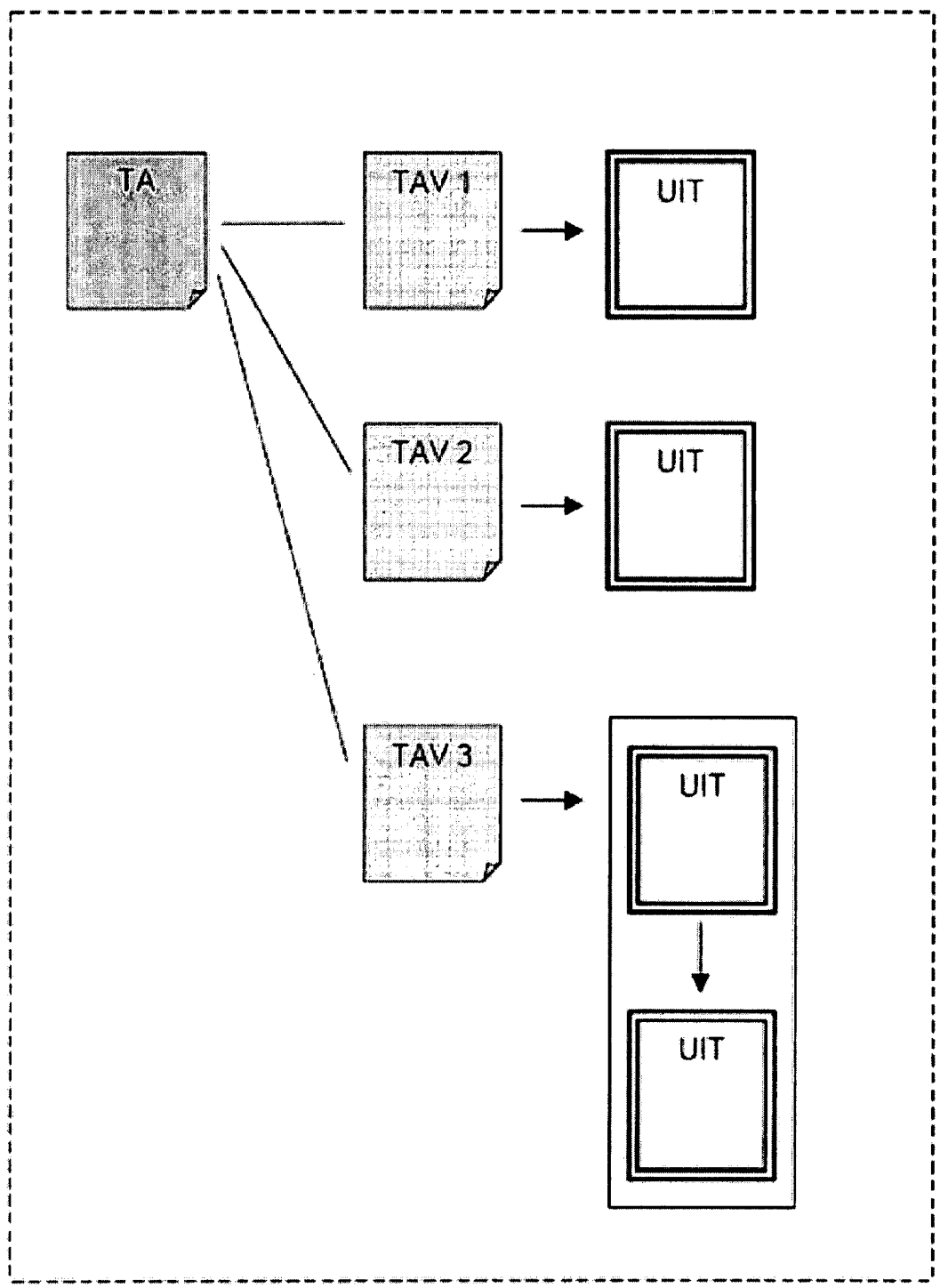
Figure 11:
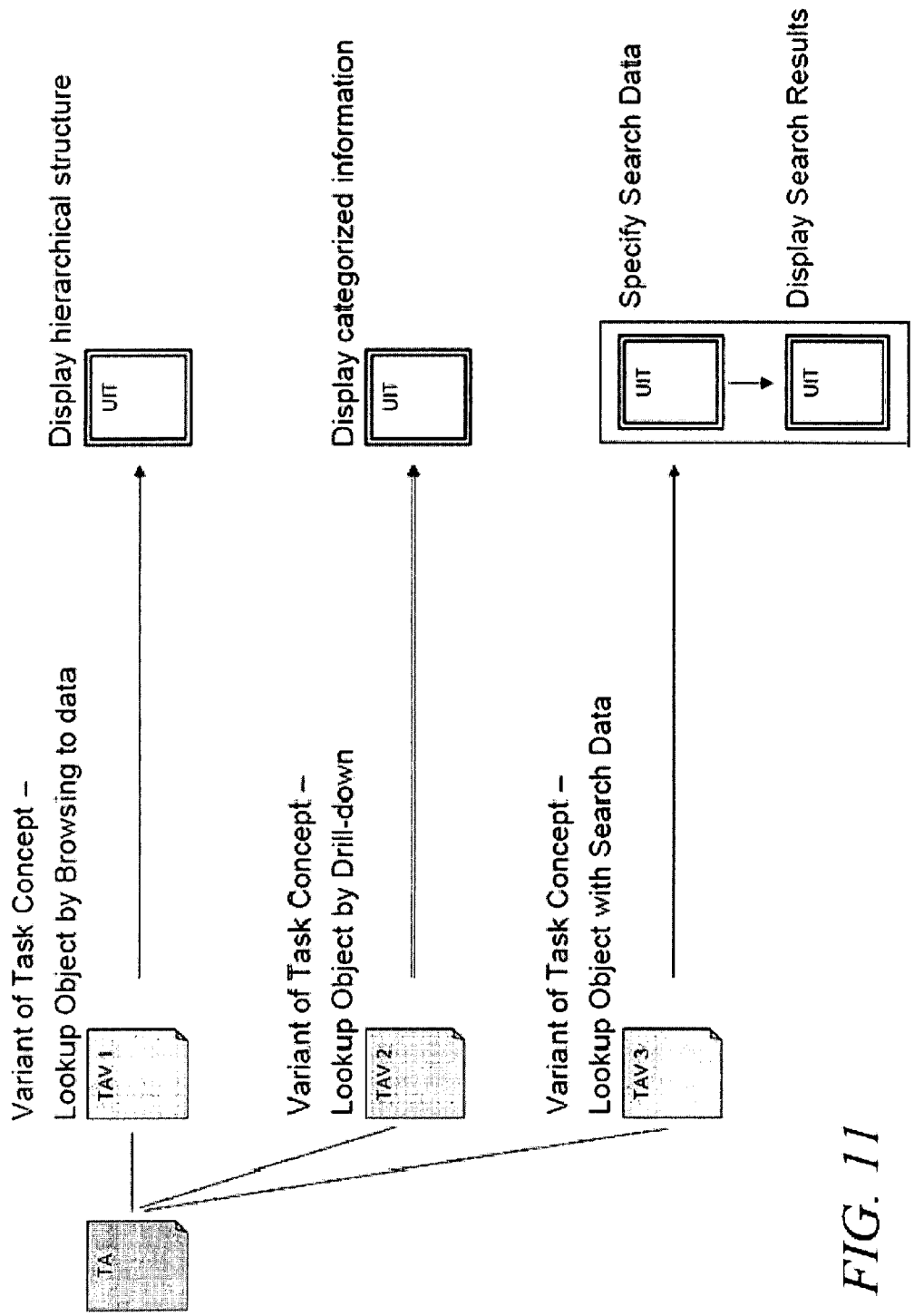

FIGS. 10 and 11 are block diagrams illustrating example embodiments of a task concept that includes variants or subtask concepts. Variants of a task concept may be assigned to different UI templates as shown. In the example embodiment of FIG. 11, variants of the "look up object" task concept are "look up object by browsing to data," "look up object by drill-down," and "look up object with search data." Variants of the same task concept may then be assigned to different UI templates in an embodiment.

Figure 12:
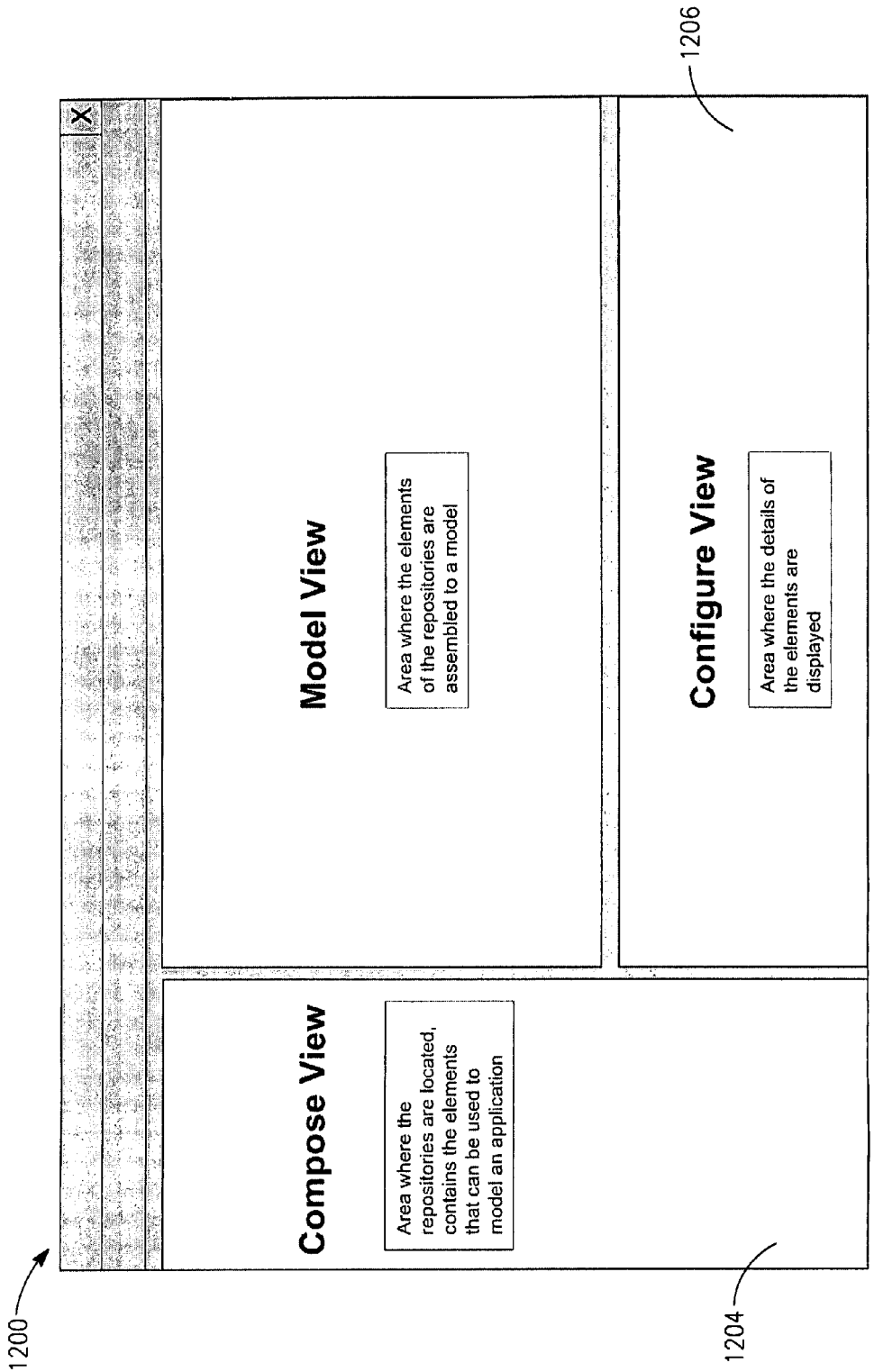

FIG. 12 is a screenshot showing a general "floor plan" for a design UI 1200 according to an example embodiment that may be generated by the presentation interface 208 of the task modeling tool 202. As shown, the design UI 1200 includes a compose view 1202 that contains components (e.g., task concepts) that may be used to define a user task model. A model view 1204 is a display area where components may be assembled by a modeler 204 and in which a flow sequence for user tasks may be defined (e.g., by coupling the components in a predetermined sequence). A configure view 1206 provides details regarding model components that are actively selected in the model view 1204.

The task modeling tool 202, and specifically the interfaces generated by the presentation interface 208, of the task modeling tool 202 may support two "design time" roles with respect to the above described methods, namely the roles of the modeler and a service establisher. A modeler may be responsible for modeling an application based on tasks and UIs, but may not be responsible for configuring services. The service establisher, on the other hand, may be responsible for attaching appropriate data and service sources to a model created by the modeler.

Figure 13:
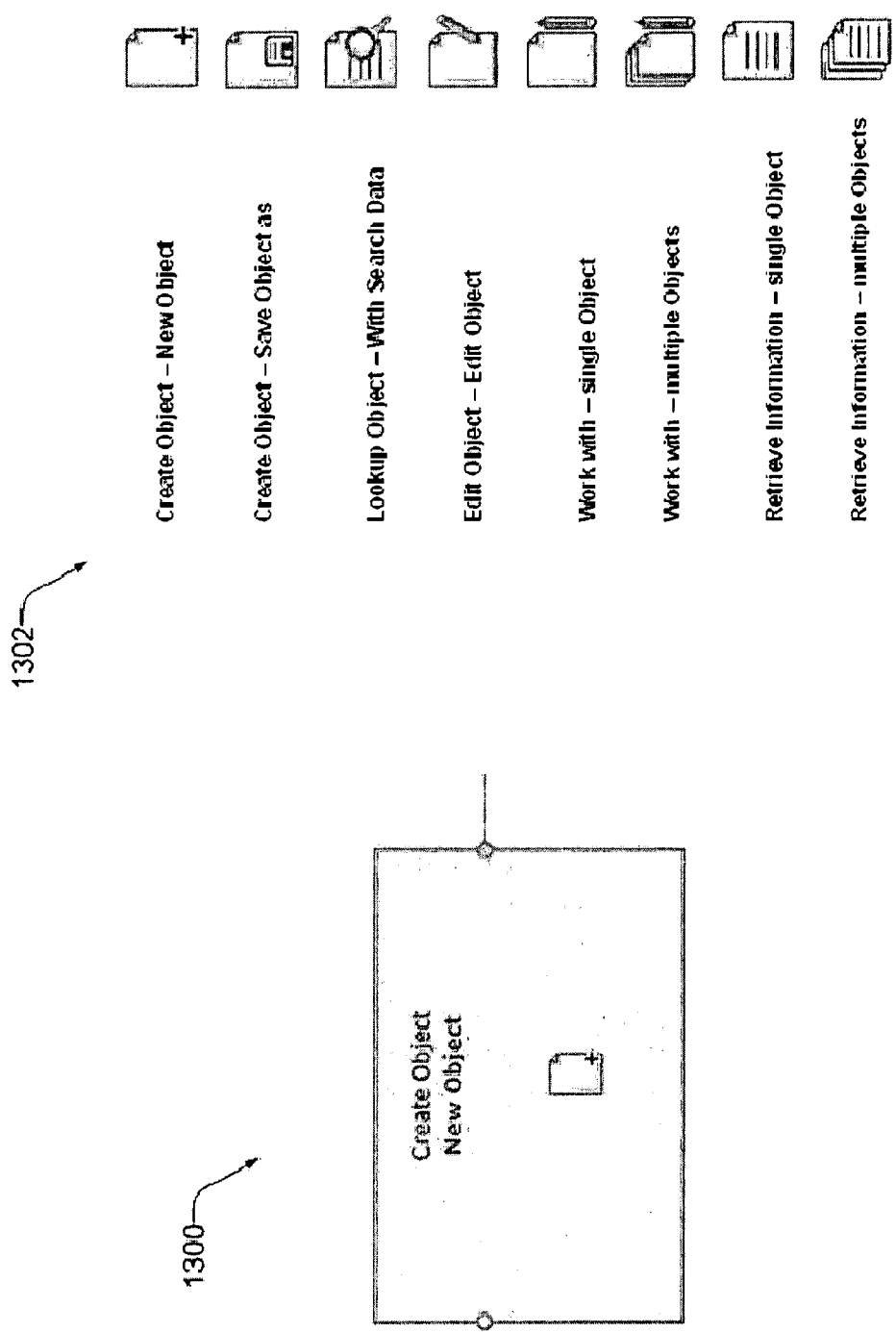
Figure 14:
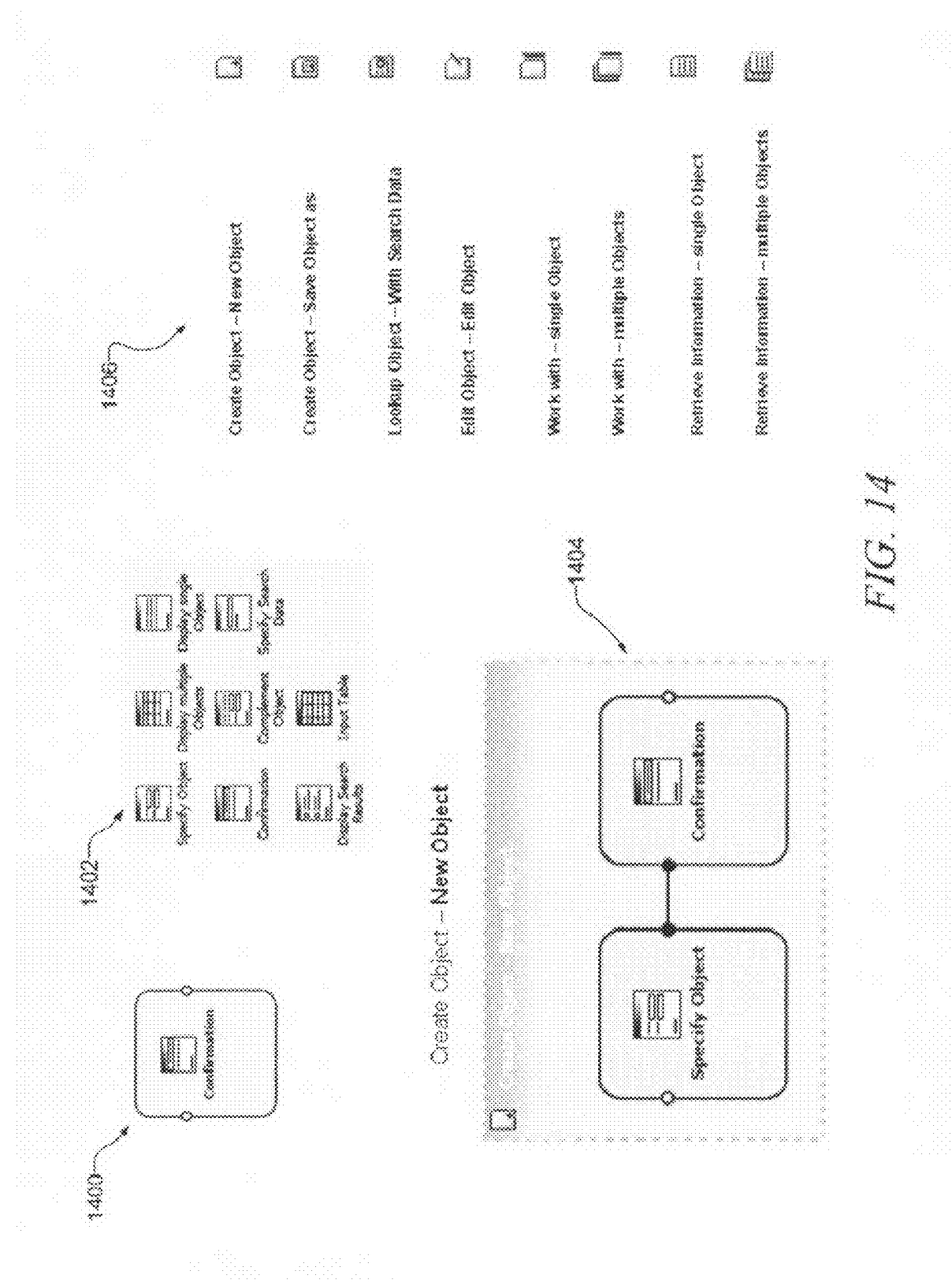
Figure 15:
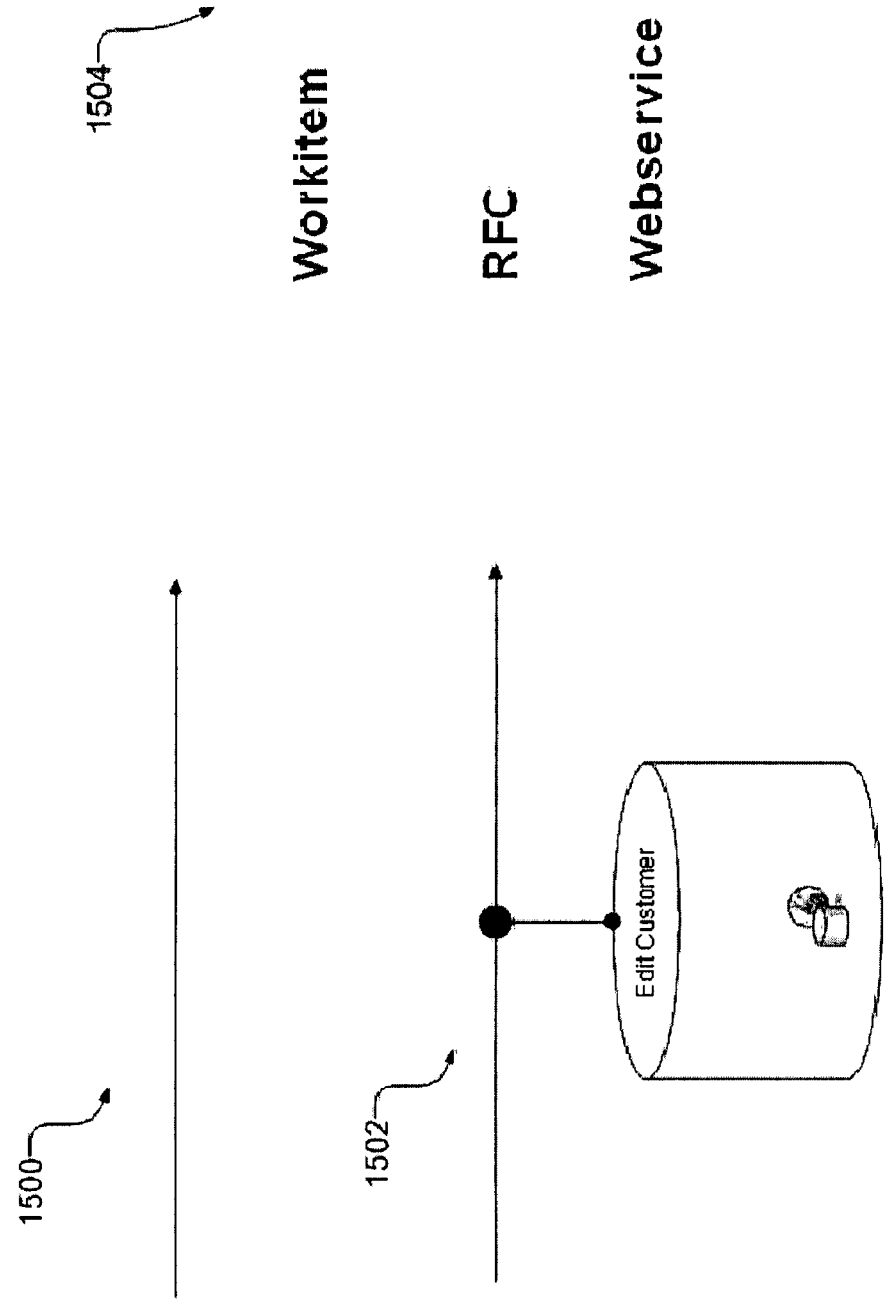

FIGS. 13-15 illustrate various example modeling entities, which may be used within the context of the application design system 200. Referring first to FIG. 13, an example "stage" task concept (e.g., task pattern) panel is illustrated at 1300. An example panel of task concept icons is illustrated and generally designated at 1302.

Turning now to FIG. 14, a UI component (e.g., screen pattern) "stage" panel is illustrated and designated generally at 1400. Example UI component icons for "stage" are generally designated at 1402. An example concept panel with a UI component is shown and generally designated at 1404. An example panel of task concept icons is illustrated and generally designated at 1406.

FIG. 15 illustrates an example icon 1500 to depict a "stage" within a task flow without service, while a stage with service is illustrated at 1502. A collection of service icons that may be, associated with a stage, according to an example embodiment, are illustrated and generally designated at 1504.

Figure 16:
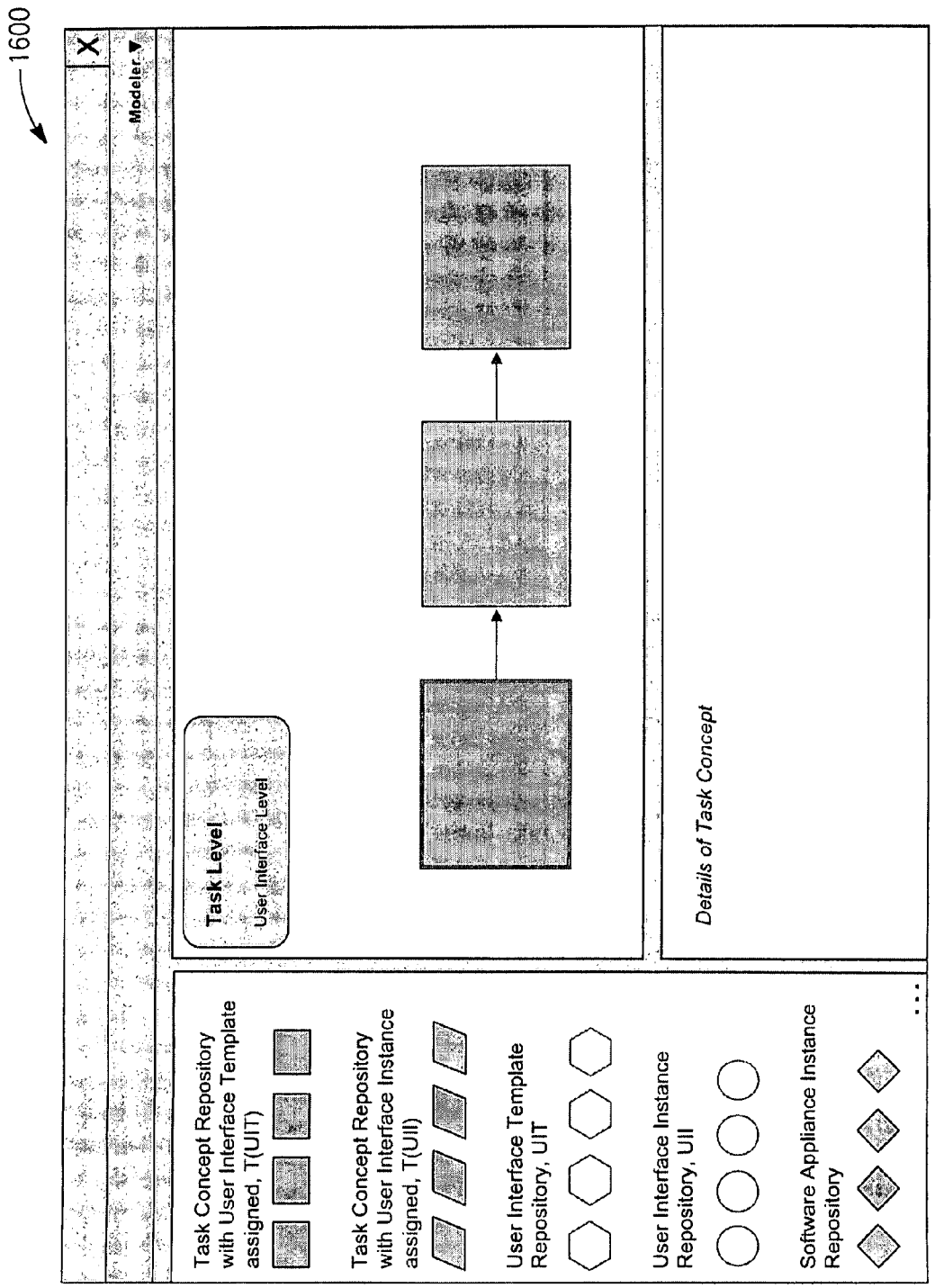
Figure 17:
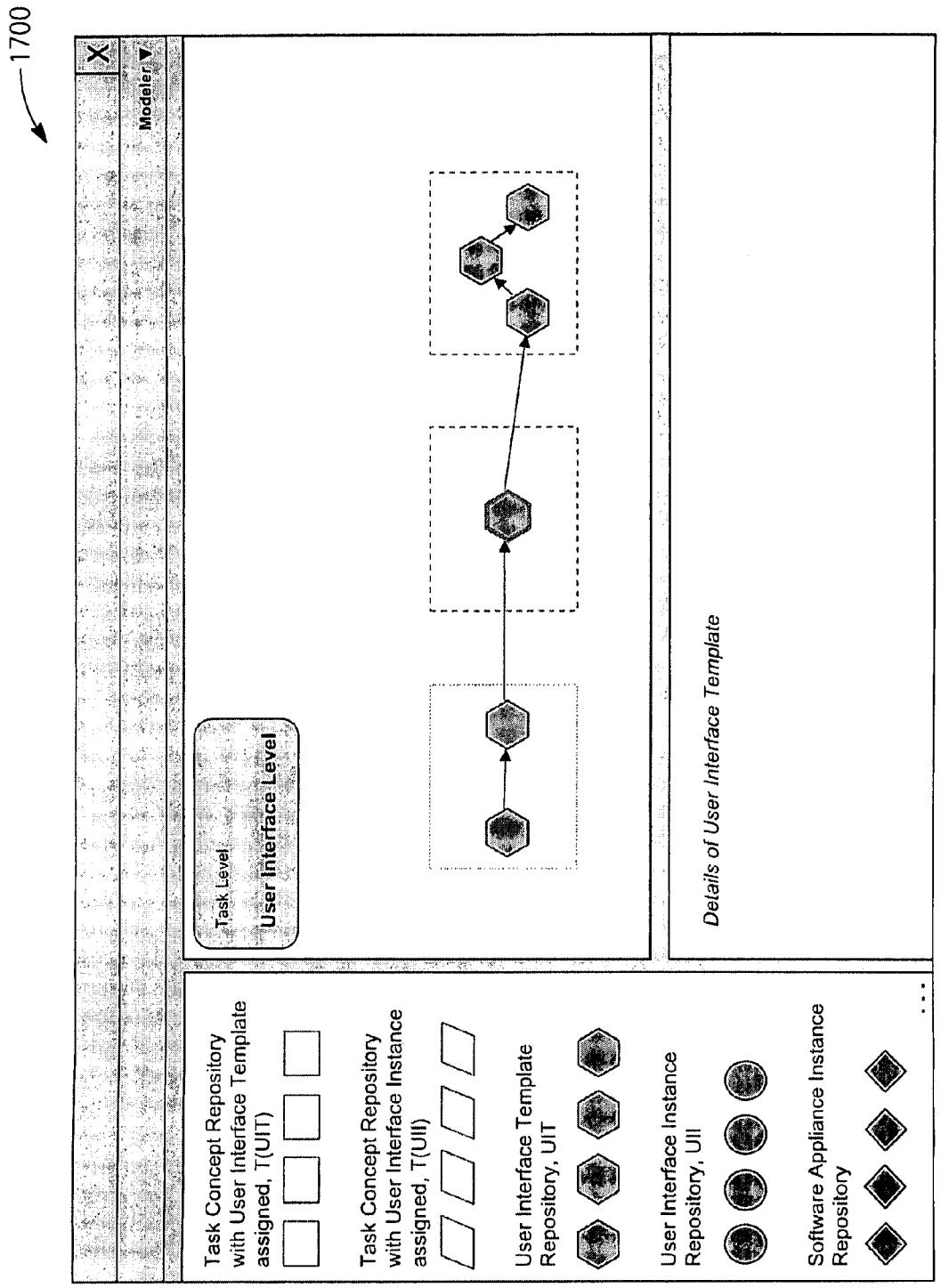
Figure 18:
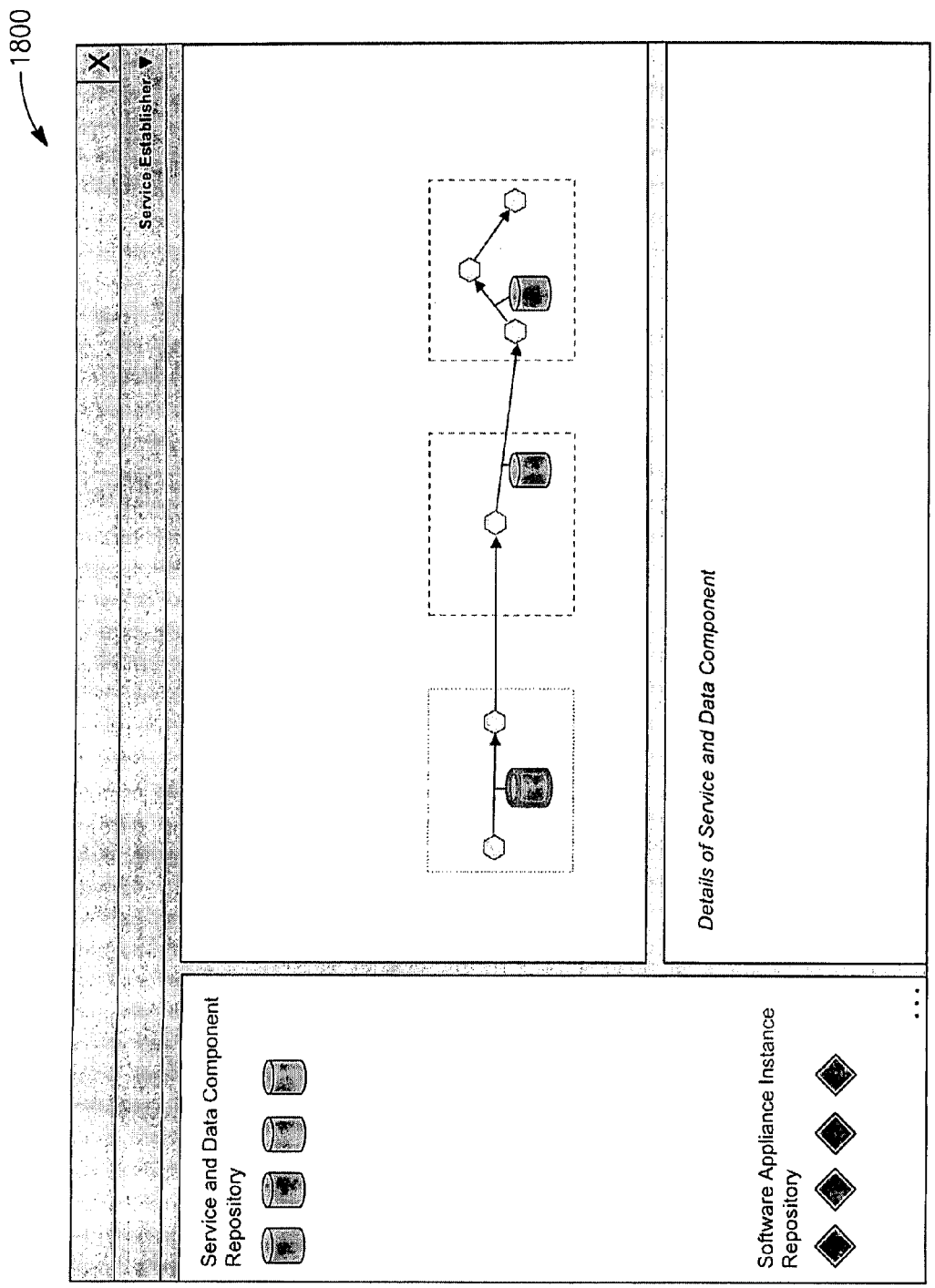

With this in mind, FIGS. 16-17 illustrate various screenshots of interfaces 1600 and 1700 that may be presented by the presentation interface 208 to a modeler 204. FIG. 16 depicts an interface 1600 that provides a task level modeler perspective and indicates the assembled task flow within an application. FIG. 17 depicts an interface 1700 that provides a UI level modeler perspective and indicates a user interface sequence. FIG. 18 illustrates a screenshot of an interface 1800 that may be presented by the presentation interface 208 to a service establisher. The interface 1800 provides access to service and data components to convert UI templates into UI instances.

Figure 19:
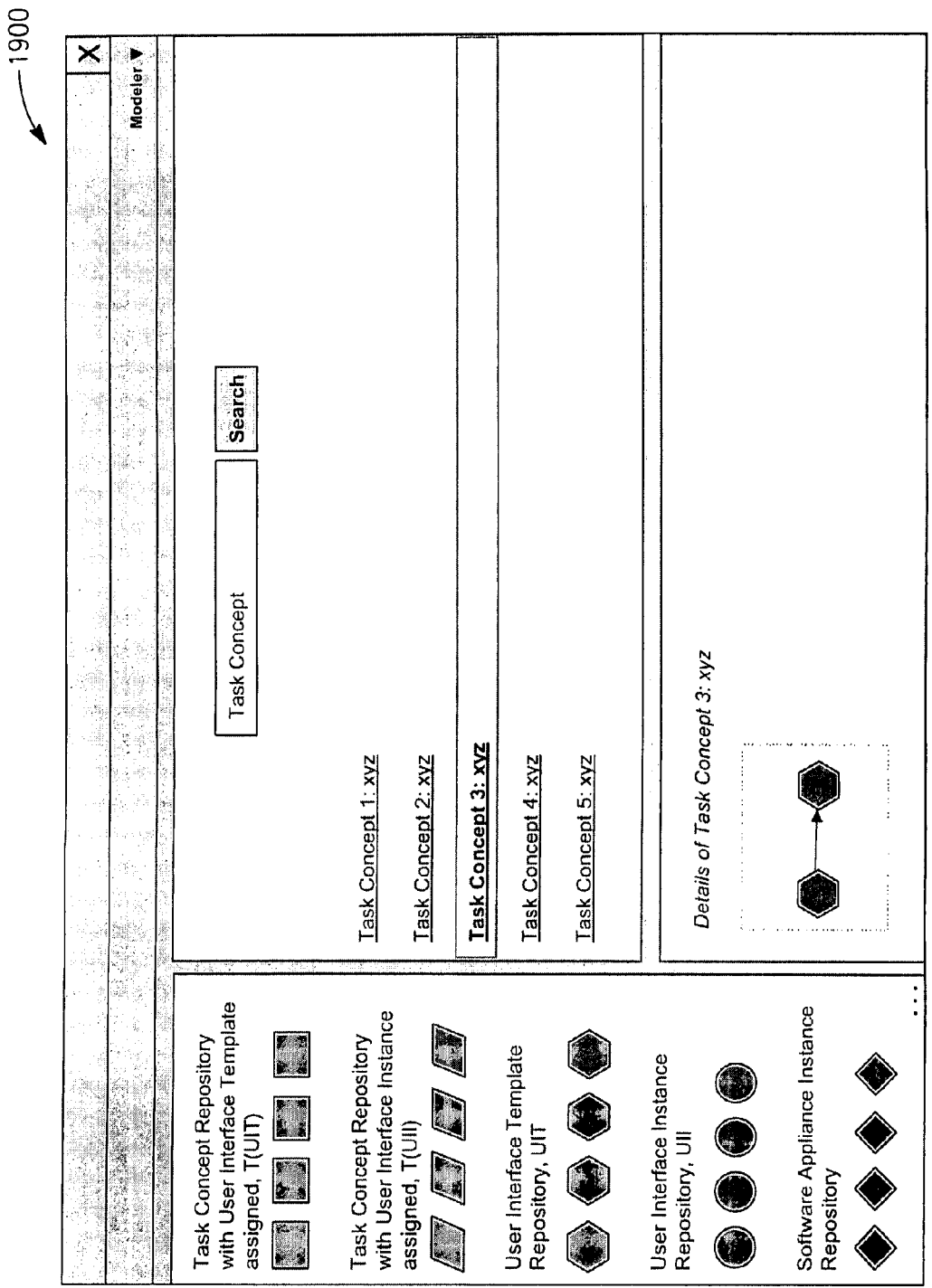

The presentation interface on the task modeling tool 202 may also make search capabilities available in all elements of the composition view, a general floor plan for which is shown in FIG. 12. FIG. 19 is a screenshot of an example search interface 1900, and provides examples of interface interactions for a modeler. For example, a modeler may search within task element repositories and UI element repositories.

Figure 20:
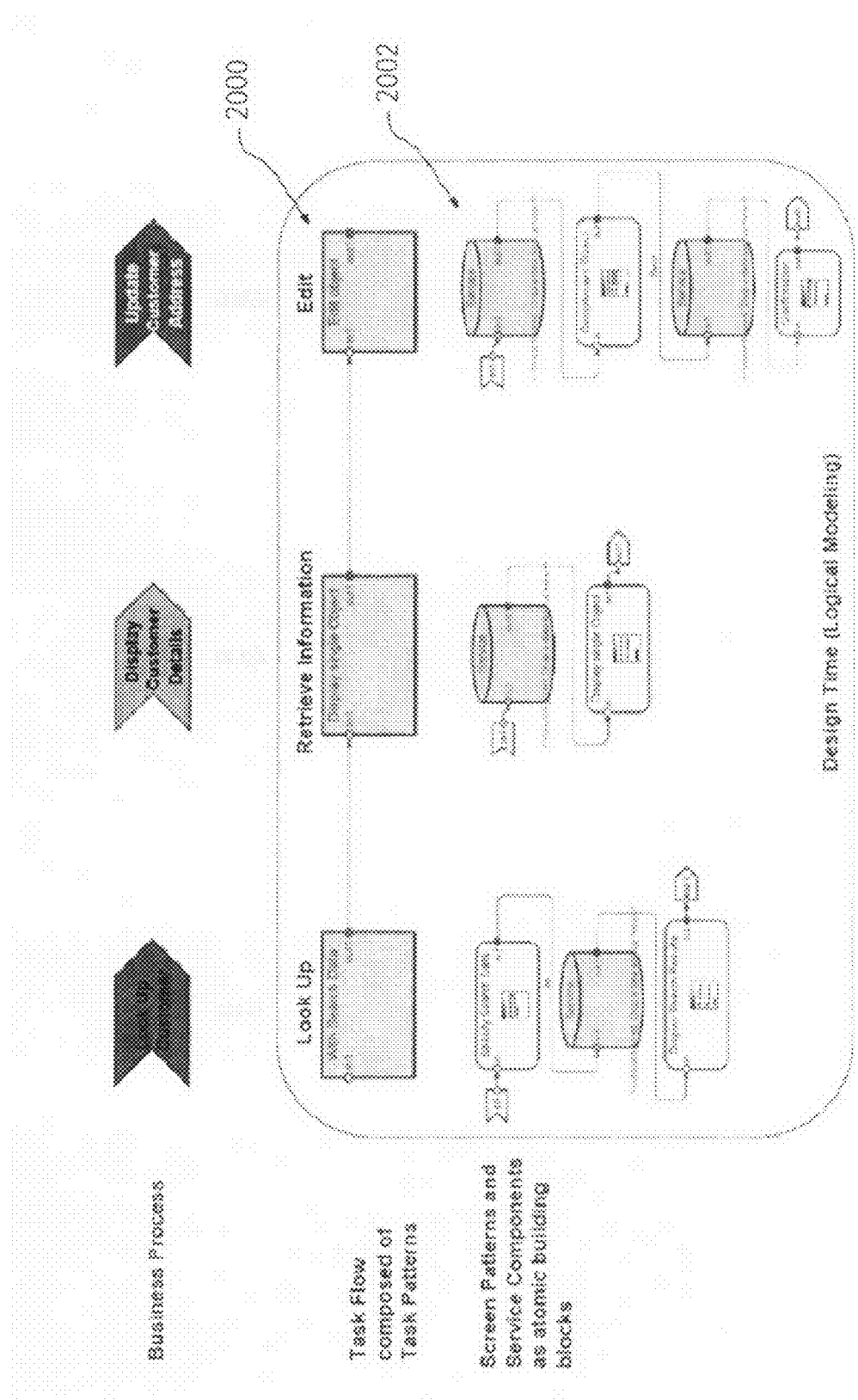
Figure 21:
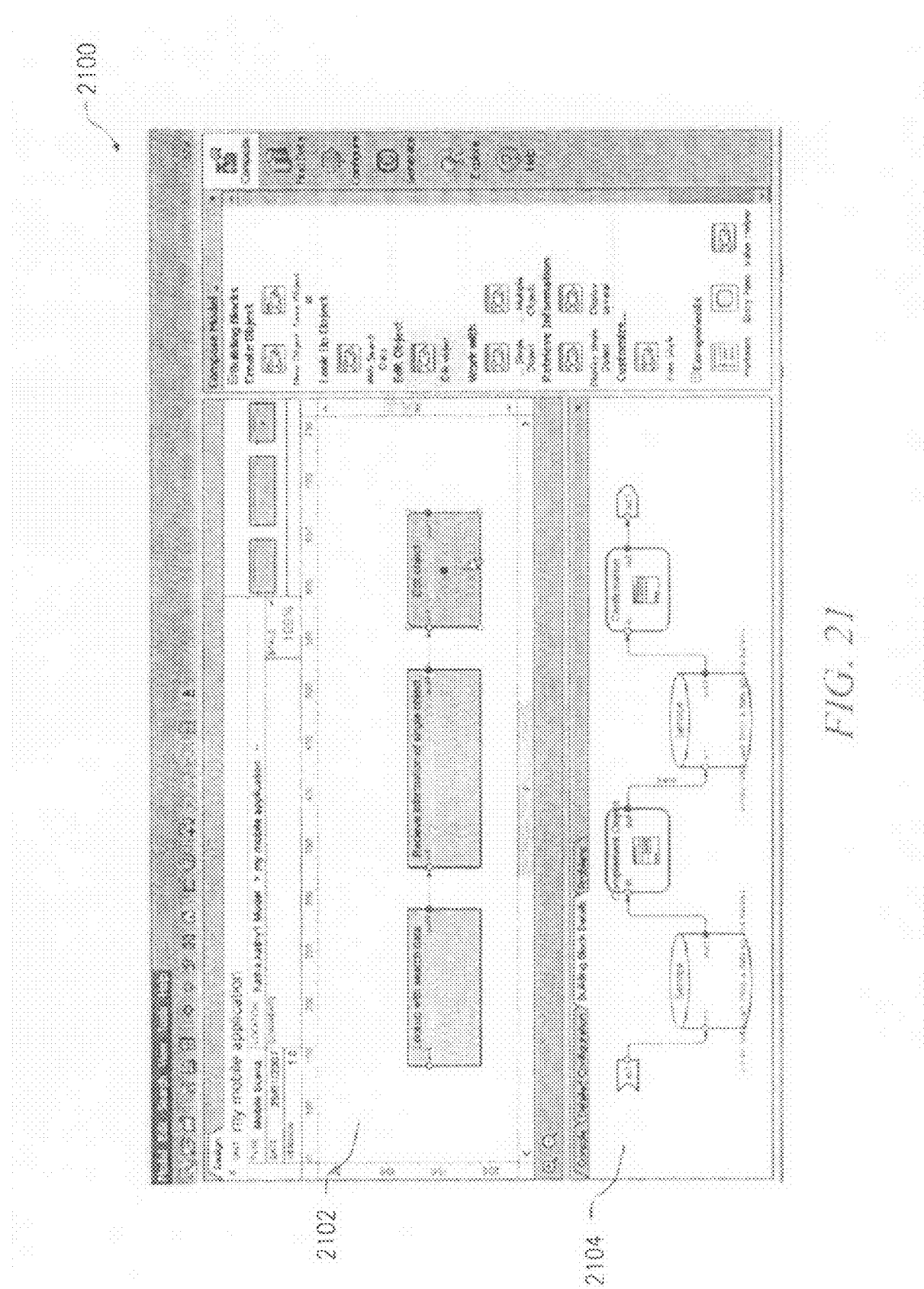
Figure 22:
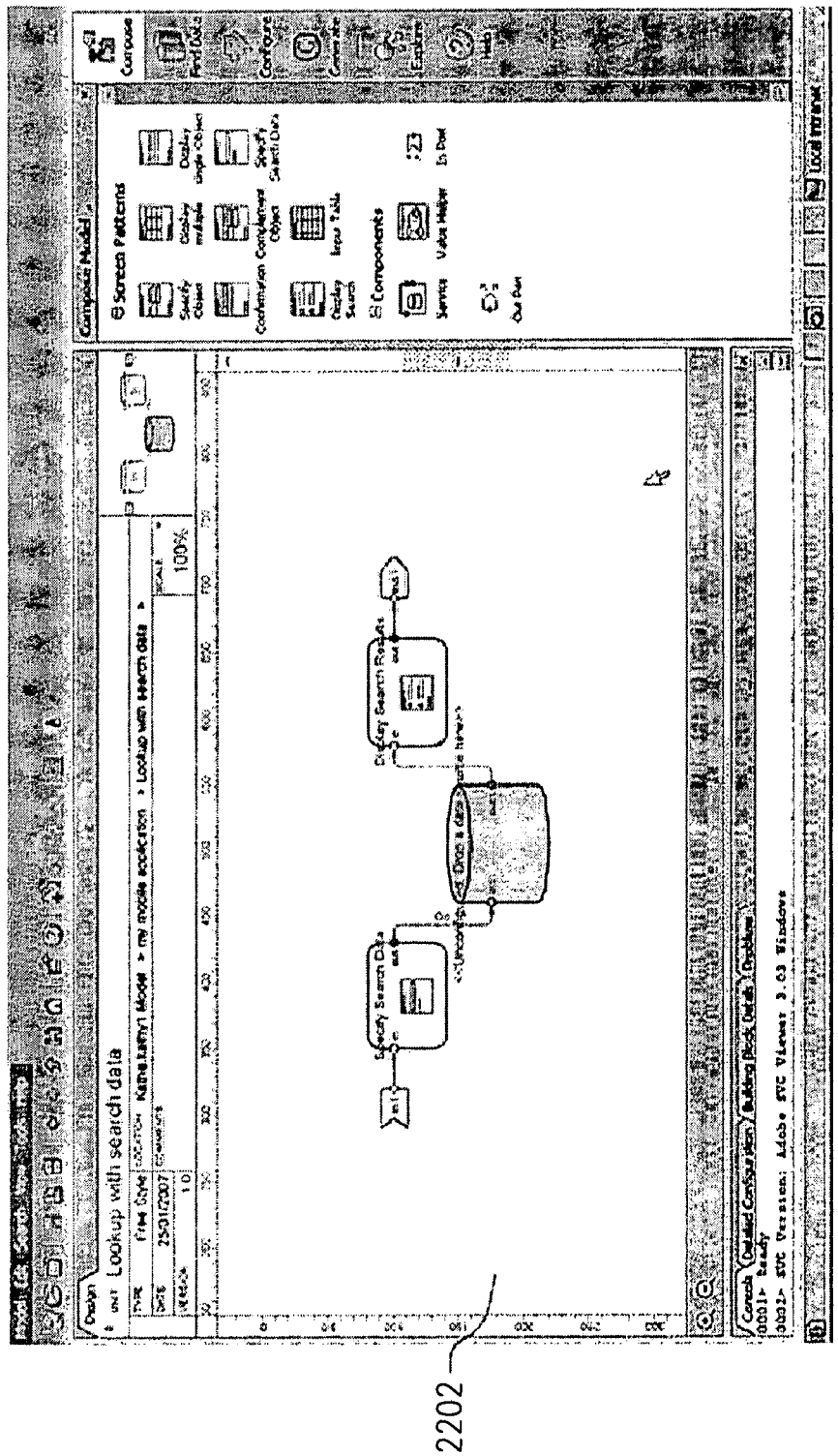

FIG. 20 is a block diagram illustrating the use of an example user task model, designated generally at 2000, to generate a software appliance instance, designated generally at 2002. It will be noted that the software appliance instance 2002 includes a number of UIs, constituting a UI model, which are coupled to data services. FIGS. 21 and 22 are screenshots of an example use scenario, in which the task modeling is implemented within the context of the VISUAL COMPOSER application, developed by SAP AG. Specifically, with reference to FIG. 21, a modeling interface 2100 is shown to include a user task flow display area 2102, and a corresponding software appliance modeling area 2104. The user task flow display area 2102 displays respective graphical icons or other indicia identifying respective user tasks, while the software instance display area indicates a flow of UIs constituting a UI model, as well as connected data sources and services that form part of the derived software application instance.

FIG. 22 is a screenshot illustrating a further example interface that may be generated (e.g., by the presentation interface 208) of the task modeling tool 202, and depicts a design display area 2202 in which a software appliance instance is shown, and within which an editor or implementer of the software appliance instance can make further edits and modifications to the applications.

Figure 23:
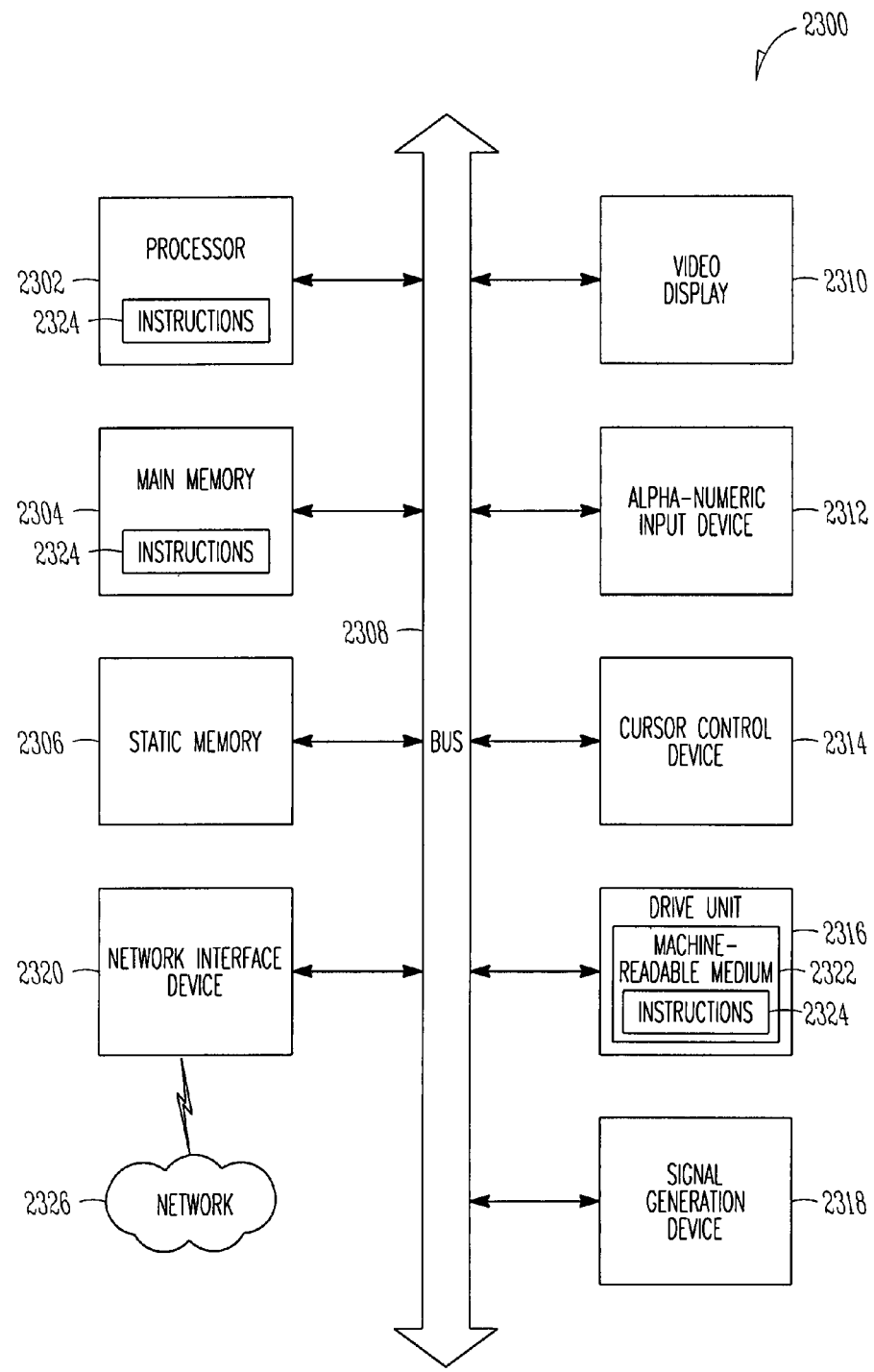

FIG. 23 is a block diagram of machine in the example form of a computer system 2300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU), a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a UI navigation device 2314 (e.g., a mouse), a disk drive unit 2316, a signal generation device 2318 (e.g., a speaker) and a network interface device 2320.

The disk drive unit 2316 includes a machine-readable medium 2322 on which is stored one or more sets of instructions and data structures (e.g., software 2324) embodying or used by any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

The software 2324 may further be transmitted or received over a network 2326 via the network interface device 2320 using any one of a number of well-known transfer protocols (e.g., HTTP).

While the machine-readable medium 2322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures used by or associated with such a set of instructions. The term "machine-readable medium" shall accordingly be taken to include, but not be limited to, solid-state memories, and optical and magnetic media.

The software may furthermore be transmitted over a network using a transmission medium. The term "transmission medium" shall be taken to include any intangible medium that is capable of storing, encoding or carrying instructions for execution by the machine, and includes digital or analog communications signals or other intangible medium to facilitate communication of such software.

Certain embodiments are described herein as including logic or a number of modules, components or mechanisms. Logic, or a module, component or a mechanism (herein after collectively referred to as a "module") may be a tangible unit capable of performing certain operations and/or being configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Method operations can be performed by one or more programmable processors executing a computer program to perform functions of the invention by operating on input data and generating output. Method operations can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

Embodiments may also be implemented in a computing system that includes a back-end component, e.g., as a data server, or that includes a middleware component, e.g., an application server, or that includes a front-end component, e.g., a client computer having a graphical UI or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments.

Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 27 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method of composing a software application having a user interface, the computer-implemented method comprising:
   creating the software application using an application design system having a processor, the creating the software application comprising:
      receiving input defining a task model of a process, the task model,
         including a plurality of tasks and at least one user task to be performed by a user of the software application, and
         modeling the process independent of a feature of the user interface and a component of the software application;
      automatically identifying, by the processor, a plurality of user interface templates by identifying at least one user interface template assigned to at least a subset of the plurality of tasks, the at least one user interface template stored in a user interface template repository communicatively coupled to the application design system; and
      creating, by the processor of the application design system, a user interface model for the software application using the plurality of user interface templates, comprising:
         generating a plurality of user interfaces by coupling services to the plurality of user interface templates and by instantiating the plurality of user interface templates with data stored in a data repository.

2. The computer-implemented method of claim 1, wherein the identifying of the plurality of user interface templates include accessing an assignment database that stores assignments between at least the subset of the plurality of tasks and corresponding user interface templates.

3. The computer-implemented method of claim 2, wherein the identifying the plurality of user interface templates includes determining that the at least one user task does not have a user interface template associated therewith.

4. The computer-implemented method of claim 1, including retrieving the plurality of user interface templates from a user interface template repository.

5. The computer-implemented method of claim 1, wherein a first user interface template of the plurality of user interface templates includes a plurality of user interface elements and interaction logic specifying interactions between the plurality of user interface elements.

6. The computer-implemented method of claim 5, wherein the interaction logic specifies presentation relationships between the plurality of user interface elements according to which the plurality of user interface elements are displayed within a user interface derived from the first user interface template.

7. The computer-implemented method of claim 5, wherein the interaction logic specifies interaction relationships between the plurality of user interface elements according to which interactions between the plurality of user interface elements are defined within a user interface derived from the first user interface template.

8. The computer-implemented method of claim 1, wherein the receiving of the input defining the task model includes receiving identification of the plurality of tasks and specification of a task flow related to the performance of the plurality of tasks, the task flow defining a sequence in which the plurality of tasks are to be performed.

9. The computer-implemented method of claim 1, wherein the receiving of input defining the task model includes receiving a first identification of a first set of tasks with which user interface templates are associated and a second identification of a second set of tasks with which user interface templates are not associated.

10. The computer-implemented method of claim 1, wherein the receiving of the input defining the task model includes detecting a connecting operation with respect to at least one task identifier from a task list display area within a modeling user interface to a task flow display area within the modeling user interface.

11. The computer-implemented method of claim 1, including storing the plurality of tasks in a task repository.

12. The computer-implemented method of claim 1, wherein the instantiating of the plurality of user interface templates includes coupling data to the plurality of user interface templates.

13. The computer-implemented method of claim 1, wherein the automatic creation of the user interface model includes defining a flow for the plurality of user interfaces based on the input defining the task model.

14. A system to compose software application having a user interface, the system comprising:
   a processor-implemented interface configured to receive input relating to a plurality of tasks and defining a task model of a process, the plurality of tasks including at least one user task to be performed by a user of the application, the task model modeling the process independent of a feature of the user interface and a component of the software application;

a processor-implemented assignment module, communicatively coupled to the processor-implemented interface, configured to automatically identify a plurality of user interface templates based on the received input, the assignment module to identifying at least one user interface template assigned to at least a subset of the plurality of tasks, the at least one user interface template stored in a user interface template repository communicatively coupled to the processor-implemented assignment module; and a processor-implemented instantiation module configured to automatically create a user interface model for an application using the plurality of user interface templates, wherein the user interface model is automatically created by coupling services to the plurality of user interface templates and by instantiating the plurality of user interface templates with data stored in a data repository to generate a plurality of user interfaces.

15. The system of claim 14, including an assignment database configured to store assignments between at least the subset of the plurality of user tasks and corresponding user interface templates, the assignment module commendably coupled to the assignment database and to access the assignment database to automatically identifying the plurality of user interface templates.

16. The system of claim 15, wherein the assignment module is further configured to determine that the at least one user task does not have a user interface template associated therewith.

17. The system of claim 14, including a data module configured to retrieve the plurality of user interface templates from a user interface template repository.

18. The system of claim 17, wherein the data module is further configured to store the plurality of tasks in a task repository.

19. The system of claim 14, wherein a first user interface template of the plurality of user interface templates includes a plurality of user interface elements and interaction logic specifying interactions between the plurality of user interface elements.

20. The system of claim 19, wherein the interaction logic specifies presentation relationships between the plurality of user interface elements according to which the plurality of user interface elements are displayed within a user interface derived from the first user interface template.

21. The system of claim 19, wherein the interaction logic specifies interaction relationships between the plurality of user interface elements according to which interactions between the plurality of user interface elements are defined within a user interface derived from the first user interface template.

22. The system of claim 14, wherein the interface is further configured to receive identification of the plurality of tasks and a specification of a flow related to the performance of the plurality of tasks.

23. The system of claim 14, wherein the interface is further configured to receive a first identification of a first set of tasks with which user interface templates are associated and a second identification of a second set of tasks with which user interface templates are not associated.

24. The system of claim 14, wherein the interface is further configured to detect a connecting operation with respect to at least one task identifier from a task list display area within a modeling user interface to a task flow display area within the modeling user interface.

25. The system of claim 14, wherein the instantiation module is further configured to couple data to the plurality of user interface templates.

26. The system of claim 14, wherein the instantiation module is further configured to define a flow for the plurality of user interfaces, based on the input relating to the plurality of tasks.

27. The system of claim 14, wherein a task is associated with metadata identifying at least one of an activity within which the task occurs, a sequence of tasks within the activity, a context within which the task occurs, a skill set to complete the task, an industry in which the task occurs, results from accomplishing the task, conditions for executing the task or a duration for completing the task.

* * * * *